(12) United States Patent
Cilingir et al.

(10) Patent No.: US 10,902,176 B2
(45) Date of Patent: *Jan. 26, 2021

(54) DETECTING AND DISPLAYING MULTI-PATTERNING FIX GUIDANCE

(71) Applicant: Synopsys, Inc., Mountain View, CA (US)

(72) Inventors: Erdem Cilingir, Santa Clara, CA (US); Srinivasa R Arikati, San Jose, CA (US); Weiping Fang, Fremont, CA (US); Marco Hug, Morgan Hill, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,890

(22) Filed: Jun. 10, 2016

(65) Prior Publication Data

US 2017/0004251 A1    Jan. 5, 2017

Related U.S. Application Data

(63) Continuation of application No. 14/459,657, filed on Aug. 14, 2014, now Pat. No. 9,384,319.

(Continued)

(51) Int. Cl.
*G06F 30/00* (2020.01)
*G06F 30/398* (2020.01)
(Continued)

(52) U.S. Cl.
CPC .............. *G06F 30/398* (2020.01); *G03F 1/36* (2013.01); *G06F 2119/18* (2020.01); *Y02P 90/02* (2015.11)

(58) Field of Classification Search
CPC .... G06F 17/5081; G06F 2217/12; G03F 1/36; Y02P 90/265
See application file for complete search history.

(56) References Cited

U.S. PATENT DOCUMENTS 6,408,428 B1 * 6/2002 Schlansker ......... G06F 17/5045
716/104
6,421,809 B1 * 7/2002 Wuytack ................. G06F 8/433
716/132

(Continued)

FOREIGN PATENT DOCUMENTS

WO    WO 14/130783 A1    8/2014
WO    WO 15/023856 A1    2/2015

OTHER PUBLICATIONS

Galinier et al. "Hybrid Evolutionary Algorithms for Graph Coloring"; Journal of Combinatorial Optimization; Year-1999; pp. 1-33.*

(Continued)

*Primary Examiner* — Naum Levin
(74) *Attorney, Agent, or Firm* — Alston & Bird LLP

(57) ABSTRACT

A computer implemented method for validating a design is presented. The method includes generating, using the computer, a graph non-decomposable to a colored graph representative of the design, when the computer is invoked to validate the design. The method further includes identifying, using the computer, at least one guidance to at least one conflict in a mask layout associated with the design, the conflict causing the graph to be non-decomposable.

66 Claims, 15 Drawing Sheets

Related U.S. Application Data

(60) Provisional application No. 61/866,516, filed on Aug. 15, 2013.

(51) Int. Cl.
*G03F 1/36* (2012.01)
*G06F 119/18* (2020.01)

(56) References Cited

U.S. PATENT DOCUMENTS

| | | | | |
|---|---|---|---|---|
| 6,704,921 | B2* | 3/2004 | Liu | G06F 17/5068 |
| | | | | 716/52 |
| 6,829,216 | B1 | 12/2004 | Nakata | |
| 7,049,589 | B2 | 5/2006 | Yamaguchi et al. | |
| 7,114,141 | B1 | 9/2006 | Teig et al. | |
| 7,560,201 | B2 | 7/2009 | Liu | |
| 7,647,212 | B2* | 1/2010 | Andreoli | G06Q 40/04 |
| | | | | 703/2 |
| 7,653,892 | B1* | 1/2010 | Gennari | G06F 17/5068 |
| | | | | 716/50 |
| 8,069,423 | B2 | 11/2011 | Ghan et al. | |
| 8,190,547 | B2 | 5/2012 | Kirovski et al. | |
| 8,209,656 | B1 | 6/2012 | Wang et al. | |
| 8,312,394 | B2 | 11/2012 | Ban et al. | |
| 8,316,329 | B1 | 11/2012 | Rigby et al. | |
| 8,327,299 | B1* | 12/2012 | Gennari | G06F 17/5068 |
| | | | | 716/100 |
| 8,347,240 | B2* | 1/2013 | Agarwal | G03F 1/70 |
| | | | | 378/35 |
| 8,359,556 | B1 | 1/2013 | Ghaida et al. | |
| 8,402,396 | B2* | 3/2013 | Kahng | G03F 1/70 |
| | | | | 716/110 |
| 8,434,043 | B1 | 4/2013 | Hsu et al. | |
| 8,448,100 | B1 | 5/2013 | Lin et al. | |
| 8,473,873 | B2 | 6/2013 | Hsu et al. | |
| 8,484,607 | B1* | 7/2013 | Tang | G06F 17/5081 |
| | | | | 716/136 |
| 8,515,724 | B2 | 8/2013 | Joshi et al. | |
| 8,516,403 | B2* | 8/2013 | Abou Ghaida | G06F 17/5068 |
| | | | | 716/52 |
| 8,572,521 | B2* | 10/2013 | Chen | G03F 1/70 |
| | | | | 716/52 |
| 8,601,409 | B1 | 12/2013 | Chen et al. | |
| 8,661,371 | B1 | 2/2014 | Wang | |
| 8,677,297 | B2 | 3/2014 | Chase et al. | |
| 8,713,483 | B2* | 4/2014 | Tritchkov | G03F 1/26 |
| | | | | 716/50 |
| 8,745,556 | B2* | 6/2014 | Chen | G06F 17/5072 |
| | | | | 430/5 |
| 8,751,974 | B2 | 6/2014 | Kahng et al. | |
| 8,799,844 | B2* | 8/2014 | Cho | G03F 7/70433 |
| | | | | 716/116 |
| 8,875,065 | B1 | 10/2014 | Lin et al. | |
| 9,141,752 | B2* | 9/2015 | Lin | G06F 17/5081 |
| 9,158,885 | B1 | 10/2015 | Gray et al. | |
| 9,298,084 | B2* | 3/2016 | Luo | G03F 1/70 |
| 9,360,750 | B2* | 6/2016 | Lin | G03F 1/70 |
| 9,384,319 | B2 | 7/2016 | Cilingir et al. | |
| 9,740,814 | B1* | 8/2017 | Ghosh | G03F 7/70 |
| 9,747,407 | B2 | 8/2017 | Choi et al. | |
| 9,904,756 | B1 | 2/2018 | Ruehl et al. | |
| 2009/0070550 | A1 | 3/2009 | Solomon | |
| 2009/0125866 | A1* | 5/2009 | Wang | G03F 7/70466 |
| | | | | 716/50 |
| 2010/0050146 | A1 | 2/2010 | Frankle et al. | |
| 2010/0064269 | A1 | 3/2010 | Lai et al. | |
| 2011/0014786 | A1 | 1/2011 | Sezginer et al. | |
| 2011/0052088 | A1 | 3/2011 | Yuan et al. | |
| 2011/0078638 | A1 | 3/2011 | Kahng et al. | |
| 2011/0197168 | A1 | 8/2011 | Chen et al. | |
| 2011/0284996 | A1 | 11/2011 | Kurusu et al. | |
| 2012/0110521 | A1* | 5/2012 | Agarwal | H01L 27/0207 |
| | | | | 716/52 |
| 2013/0007674 | A1 | 1/2013 | Abou Ghaida et al. | |
| 2013/0024822 | A1 | 1/2013 | Hsieh et al. | |
| 2013/0036397 | A1 | 2/2013 | Lee et al. | |
| 2013/0061183 | A1 | 3/2013 | Abou Ghaida et al. | |
| 2013/0061185 | A1 | 3/2013 | Abou Ghaida et al. | |
| 2013/0074018 | A1 | 3/2013 | Hsu et al. | |
| 2013/0174106 | A1 | 7/2013 | Hsu et al. | |
| 2014/0007026 | A1 | 1/2014 | Chen et al. | |
| 2014/0053118 | A1 | 2/2014 | Chen et al. | |
| 2014/0189611 | A1 | 7/2014 | Lai et al. | |
| 2014/0244215 | A1 | 8/2014 | Nakayama et al. | |
| 2014/0245237 | A1 | 8/2014 | Cilingir et al. | |
| 2014/0282293 | A1* | 9/2014 | Lin | G06F 17/5081 |
| | | | | 716/52 |
| 2014/0372958 | A1 | 12/2014 | Lin et al. | |
| 2015/0040077 | A1 | 2/2015 | Ho et al. | |
| 2015/0234974 | A1 | 8/2015 | Dechene et al. | |
| 2017/0124242 | A1 | 5/2017 | Sharma et al. | |
| 2017/0147740 | A1 | 5/2017 | Chang | |
| 2017/0206300 | A1 | 7/2017 | Xue et al. | |
| 2017/0336707 | A1 | 11/2017 | Choi et al. | |

OTHER PUBLICATIONS

Beigel et al., "3-Coloring in Time O(1.3289n)," Journal of Algorithms 54: 168-204 (2005).

Dorigo et al., "An Introduction to Ant Colony Optimization," Universite Libre de Bruxelles Institut de Recherches Interdisciplinaires et de Developpements en Intelligence Artificelle (IRIDIA) Technical Report No. TR/IRIDIA/2006-010, 22 pages (2006).

Galinier et al., "Hybrid Evolutionary Algorithms for Graph Coloring", Journal of Combinatorial Optimization, Kluwer Academic Publishers, pp. 1-33, (1999).

Grosan et al., "Hybrid Evolutionary Algorithms: Methodologies, Architectures, and Reviews," Studies in Computational Intelligence (SCI) 75: 1-17 (2007).

Kuang, Jian et al. "An Efficient Layout Decomposition Approach to Triple Patterning Lithography," Design Automation Conference (DAC), May-Jun. 2013, pp. 1-6.

Li et al., "14nm M1 Triple Patterning," Proceedings of the International Society of Optics and Photonics (SPIE) 8326: 832612.1-832612-7 (2012).

Tian et al., "A Polynomial Time Triple Patterning Algorithm for Cell Based Row-Structure Layout," 2011 Institute of Electrical and Electronics Engineers/Association for Computing Machinery International Conference on Computer-Aided Design (ICCAD) San Jos.

Yu et al., "Layout Decompostion for Triple Patterning Lithography," 2011 Institute of Electrical and Electronics Engineers/Association for Computing Machinery International Conference on Computer-Aided Design (ICCAD), San Jose, California, pp. 1-8, (2011).

International Search Report and Written Opinion for PCT Application No. PCT/US2014/017619 dated May 30, 2014, 10 pages.

International Search Report and Written Opinion dated Nov. 25, 2014 for PCT Patent Application No. PCT/US2014/051086, 11 pages.

U.S. Appl. No. 14/459,657, Non-Final Office Action dated Oct. 7, 2015.

U.S. Appl. No. 14/459,657, Notice of Allowance dated Mar. 11, 2016.

Fang et al., "A novel layout decomposition algorithm for triple patterning lithography," in IEEE Trans. on Computer-Aided Design of Integrated Circuit s and Systems (TCAD), 33(3),:397-408, (2014).

Fister et al., "Using differential evolution for the graph coloring," Differential Evolution (SDE), IEEE, Symposium on Apr. 11, 2011, pp. 1-7, doi: 10.1109/SDE.2011.5952075, (2011).

Knuth, "Dancing Links," arxiv.org, Cornell University Library, arXiv:cs/0011047 [cs.DS], 26 pages, (2000).

EPO Application No. 14753896.1, European Search Report and European Search Opinion dated Dec. 20, 2016.

EPO Application No. 14753896.1, Reply to the Opinion with the European Search Report dated Jun. 21, 2017.

EPO Application No. 16200435.2 (Published as EP3193271), European Search Report and European Search Opinion dated Jun. 21, 2017.

(56) References Cited

OTHER PUBLICATIONS

Taiwanese Application No. 103105938, First Office Action dated Jun. 5, 2015.
Taiwanese Application No. 103105938, Second Office Action dated Oct. 5, 2015.
U.S. Appl. No. 14/185,717, Final Office Action dated Jan. 13, 2017.
U.S. Appl. No. 14/185,717, Non-Final Office Action dated Apr. 5, 2016.
U.S. Appl. No. 14/185,717, Non-Final Office Action dated Aug. 15, 2017.
U.S. Appl. No. 14/678,831, Final Office Action dated Dec. 23, 2016.
U.S. Appl. No. 14/678,831, Non-Final Office Action dated Apr. 27, 2016.
U.S. Appl. No. 14/678,831, Notice of Allowance dated Jul. 12, 2017.
U.S. Appl. No. 14/929,113, Non-Final Office Action dated Jun. 2, 2017.
U.S. Appl. No. 14/996,796, Non-Final Office Action dated Aug. 22, 2017.
WIPO Application No. PCT/US2014/017619, PCT International Preliminary Report on Patentability dated Aug. 25, 2015.
WIPO Application No. PCT/US2014/051086, PCT International Preliminary Report on Patentability dated Feb. 15, 2016.
U.S. Appl. No. 14/185,717, Final Office Action dated May 11, 2018.
U.S. Appl. No. 14/929,113, Final Office Action dated Feb. 14, 2018.
U.S. Appl. No. 14/996,796, Final Office Action dated May 3, 2018.
U.S. Appl. No. 15/359,579, Non-Final Office Action dated Apr. 16, 2018.
U.S. Appl. No. 15/669,502, Non-Final Office Action dated Dec. 26, 2017.
U.S. Appl. No. 14/185,717, Non-Final Office Action dated Oct. 11, 2018.
U.S. Appl. No. 14/929,113, Non-Final Office Action dated Aug. 9, 2018.
U.S. Appl. No. 15/669,502, Notice of Allowance dated Aug. 16, 2018.
U.S. Appl. No. 14/996,796, Non-Final Office Action dated Nov. 16, 2018.
U.S. Appl. No. 15/359,579, Final Office Action dated Nov. 26, 2018.
U.S. Appl. No. 15/669,502, Notice of Allowance dated Jan. 15, 2019.

* cited by examiner

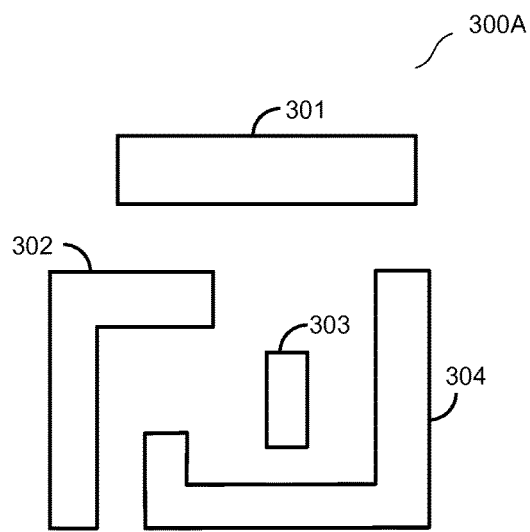
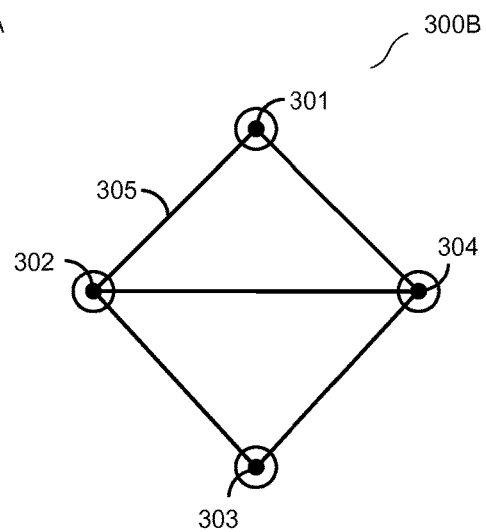
FIG. 3A
FIG. 3B
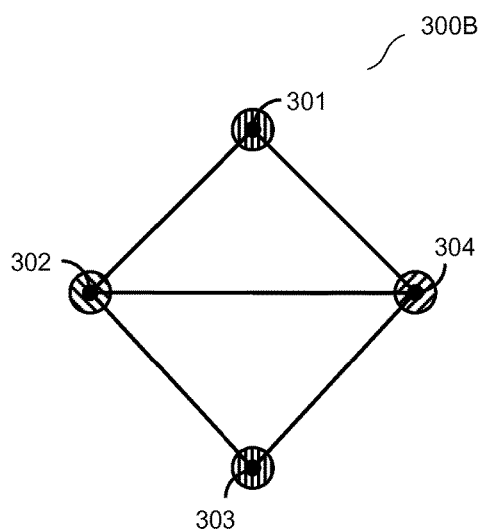
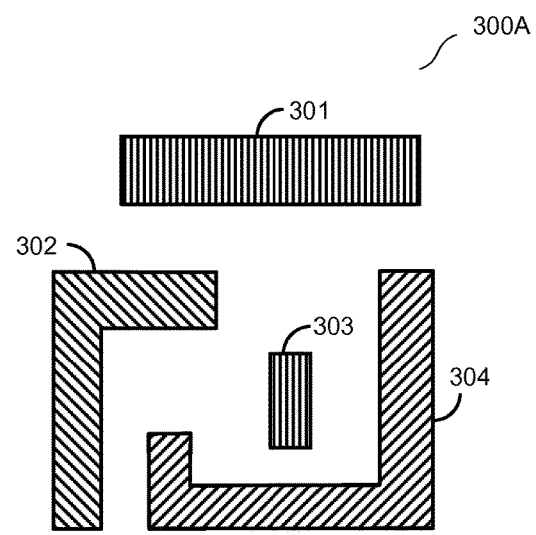
FIG. 3C
FIG. 3D

DETECTING AND DISPLAYING MULTI-PATTERNING FIX GUIDANCE

CROSS-REFERENCES TO RELATED APPLICATIONS

This Application is a Continuation of U.S. application Ser. No. 14/459,657, filed on Aug. 14, 2014, now U.S. Pat. No. 9,384,319, entitled "DETECTING AND DISPLAYING MULTI-PATTERNING FIX GUIDANCE", which Application claims the benefit of priority under 35 U.S.C. § 119(e) to U.S. Provisional Application No. 61/866,516, filed on Aug. 15, 2013, entitled "DETECTING AND DISPLAYING MULTI-PATTERNING FIX GUIDANCE", the contents of all of which are incorporated herein by reference in their entirety.

This Application is related to U.S. application Ser. No. 14/185,717, filed on Feb. 20, 2014, entitled "HYBRID EVOLUTIONARY ALGORITHM FOR TRIPLE-PATTERNING"; U.S. Pat. No. 8,312,394, entitled "METHOD AND APPARATUS FOR DETERMINING MASK LAYOUTS FOR A SPACER-IS-DIELECTRIC SELF-ALIGNED DOUBLE-PATTERNING PROCESS" by Yonchan BAN, et al.; and U.S. Pat. No. 7,560,201, entitled "PATTERNING A SINGLE INTEGRATED CIRCUIT LAYER USING MULTIPLE MASKS AND MULTIPLE MASKING LAYERS" by Tsu-Jae King LIU, the contents of all of which are incorporated herein by reference in their entirety.

BACKGROUND

The present invention relates to electronic design automation (EDA), and more particularly, to techniques for identifying mask layout guidance to fix errors of a multiple-patterning process.

Improvements in semiconductor integration densities have largely been achieved through corresponding improvements in semiconductor manufacturing technologies. As semiconductor manufacturing technologies move into the deep submicron era, the semiconductor industry is considering a number of new technologies, such as extreme ultraviolet (EUV) lithography and massively parallel electron beam lithography. Unfortunately, these technologies are not ready for production as yet.

Improvements in process technology can increase integration densities beyond what is achievable in present generation photolithography printing. As an example, double-patterning technology has been used for manufacturing design intents having higher pattern density than those pattern densities limited by what is directly printable by photolithography using a given generation manufacturing process. Double-patterning technology uses two different masks to produce higher pattern density in a design intent than is achievable by using just one mask. However, double-patterning technology is not able to handle design intents with more complex and higher pattern density that need to be printed using triple or higher multiple-patterning technology because of difficulty with design intent validation.

Accordingly, there is a need to validate design intents using triple or higher multiple-patterning technology.

SUMMARY

According to one embodiment of the present invention, a computer implemented method for validating a design is presented. The method includes generating, using the computer, a graph non-decomposable to a colored graph representative of the design, when the computer is invoked to validate the design. The method further includes identifying, using the computer, at least one guidance to at least one conflict in a mask layout associated with the design, the conflict causing the graph to be non-decomposable.

According to one embodiment, the design includes an integrated circuit. According to one embodiment, the graph is representative of a portion of the design that is non-decomposable. According to one embodiment, the colored graph includes at least three colors. According to one embodiment, each of the at least three colors is associated with a different one of at least three masks used in a multiple-patterning process. According to one embodiment, identifying further includes outputting, using the computer, the guidance including a representation of a portion of the design associated with the graph.

According to one embodiment, the design includes a multitude of shapes. Identifying further includes outputting, using the computer, the guidance including a subset of the multitude of shapes, the subset being associated with the graph. According to one embodiment, the design includes a multitude of shapes. The graph includes a multitude of vertices, each one of the multitude of vertices associated with a different one of the multitude of shapes.

According to one embodiment, the graph includes a multitude of edges. Each one of the multitude of edges is associated with a different pair of the multitude of shapes, the pair of the multitude of shapes being associated with a design rule constraint. According to one embodiment, a conflict is detected when one of the multitude of edges is between a pair of the multitude of vertices colored with the same color.

According to one embodiment, identifying further includes building, using the computer, a first set characterized by an upper bound on a minimum number of the at least one conflict using a first coloring attempt of one of a multitude of coloring attempts on the graph by a coloring algorithm.

According to one embodiment, the coloring algorithm determines the graph is non-decomposable. According to one embodiment, the coloring algorithm includes an exhaustive search algorithm. According to one embodiment, the coloring algorithm includes an approximation algorithm. According to one embodiment, the coloring algorithm includes a hybrid evolutionary algorithm. According to one embodiment, identifying further includes outputting, using the computer, the guidance including a representation of the design associated with the first set.

According to one embodiment, the design includes a multitude of shapes. Identifying further includes outputting, using the computer, the guidance including a subset of the multitude of shapes, the subset being associated with the first set. According to one embodiment, building includes finding the upper bound customized in accordance with a specification preferring at least one conflict rather than another conflict.

According to one embodiment, identifying further includes building, using the computer, a second set characterized by the upper bound on the minimum number of the at least one conflict using a second coloring attempt of one of the multitude of coloring attempts, the second set being different from the first set. Identifying further includes constructing, using the computer, a third set associated with a union of the first set and the second set, and outputting, using the computer, the guidance including a representation of the design associated with the third set.

According to one embodiment, the design includes a multitude of shapes. Identifying further includes outputting, using the computer, the guidance including a subset of the multitude of shapes, the subset being associated with the third set.

According to one embodiment, the design includes a multitude of shapes. Identifying further includes cutting away, using the computer, a portion of at least one of the shapes in a first subset of the multitude of shapes thereby forming a second subset, the portion being disposed distal to the union, the first subset being associated with the third set. Identifying further includes outputting, using the computer, the guidance including the second subset.

According to one embodiment, the cutting away is in accordance with a closed loop formed by a multitude of shapes of the first subset and a multitude of the at least one conflict. According to one embodiment, the cutting away is in accordance with at least one conflict not included in the closed loop.

According to one embodiment of the present invention, a non-transitory computer-readable storage medium includes instructions which when executed by a computer cause the computer to generate a graph non-decomposable to a colored graph representative of the design, when the computer is invoked to validate the design. The instructions further cause the computer to identify at least one guidance to at least one conflict in a mask layout associated with the design, the conflict causing the graph to be non-decomposable.

According to one embodiment, the instructions that cause the computer to identify further cause the computer to output the guidance including a representation of a portion of the design associated with the graph. According to one embodiment, the design includes a multitude of shapes. The instructions that cause the computer to identify further cause the computer to output the guidance including a subset of the multitude of shapes. The subset is associated with the graph.

According to one embodiment, the instructions that cause the computer to identify further cause the computer to build a first set characterized by an upper bound on a minimum number of the at least one conflict using a first coloring attempt of one of a multitude of coloring attempts on the graph by a coloring algorithm. According to one embodiment, the instructions that cause the computer to identify further cause the computer to output the guidance including a representation of the design associated with the first set.

According to one embodiment, the design includes a multitude of shapes. The instructions that cause the computer to identify further cause the computer to output the guidance including a subset of the multitude of shapes. The subset is associated with the first set.

According to one embodiment, the instructions that cause the computer to build further cause the computer to find the upper bound customized in accordance with a specification preferring at least one conflict rather than another conflict.

According to one embodiment, the instructions that cause the computer to identify further cause the computer to build a second set characterized by the upper bound on the minimum number of the at least one conflict using a second coloring attempt of one of the multitude of coloring attempts, the second set being different from the first set. The instructions further cause the computer to construct a third set associated with a union of the first set and the second set, and output the guidance including a representation of the design associated with the third set.

According to one embodiment, the design includes a multitude of shapes. The instructions that cause the computer to identify further cause the computer to output the guidance including a subset of the multitude of shapes. The subset is associated with the third set.

According to one embodiment, the design includes a multitude of shapes. The instructions that cause the computer to identify further cause the computer to cut away a portion of at least one of the shapes in a first subset of the multitude of shapes thereby forming a second subset, the portion being disposed distal to the union. The first subset is associated with the third set. The instructions further cause the computer to output the guidance including the second sub set.

According to one embodiment, the instructions that cause the computer to cut away are in accordance with a closed loop formed by a multitude of shapes of the first subset and a multitude of the at least one conflict. According to one embodiment, the instructions that cause the computer to cut away are in accordance with at least one conflict not included in the closed loop.

According to one embodiment of the present invention, a system for validating a design is configured to generate a graph non-decomposable to a colored graph representative of the design, when the computer is invoked to validate the design. The system is further configured to identify at least one guidance to at least one conflict in a mask layout associated with the design, the conflict causing the graph to be non-decomposable.

According to one embodiment, the system is further configured to output the guidance including a representation of a portion of the design associated with the graph. According to one embodiment, the design includes a multitude of shapes. The system is further configured to output the guidance including a subset of the multitude of shapes, the subset being associated with the graph.

According to one embodiment, the system is further configured to build a first set characterized by an upper bound on a minimum number of the at least one conflict using a first coloring attempt of one of a multitude of coloring attempts on the graph by a coloring algorithm. According to one embodiment, the system is further configured to output the guidance including a representation of the design associated with the first set.

According to one embodiment, the design includes a multitude of shapes. The system is further configured to output the guidance including a subset of the multitude of shapes, the subset being associated with the first set. According to one embodiment, the system is further configured to find the upper bound customized in accordance with a specification preferring at least one conflict rather than another conflict.

According to one embodiment, the system is further configured to build a second set characterized by the upper bound on the minimum number of the at least one conflict using a second coloring attempt of one of the multitude of coloring attempts, the second set being different from the first set. The system is further configured to construct a third set associated with a union of the first set and the second set, and output the guidance including a representation of the design associated with the third set.

According to one embodiment, the design includes a multitude of shapes. The system is further configured to output the guidance including a subset of the multitude of shapes, the subset being associated with the third set.

According to one embodiment, the design includes a multitude of shapes. The system is further configured to cut away a portion of at least one of the shapes in a first subset of the multitude of shapes thereby forming a second subset, the portion being disposed distal to the union, the first subset being associated with the third set. The system is further configured to output the guidance including the second subset.

According to one embodiment, the system is further configured to cut away in accordance with a closed loop formed by a multitude of shapes of the first subset and a multitude of the at least one conflict. According to one embodiment, the system is further configured to cut away are in accordance with at least one conflict not included in the closed loop.

A better understanding of the nature and advantages of the embodiments of the present invention may be gained with reference to the following detailed description and the accompanying drawings.

BRIEF DESCRIPTION OF THE DRAWINGS

FIG. 3A depicts a simplified exemplary first design intent including four shapes.

FIG. 3B depicts simplified exemplary construction of a graph including vertices associated respectively with the shapes depicted in FIG. 3A, in accordance with one embodiment of the present invention.

FIG. 3C depicts a simplified exemplary three-coloring of the graph depicted in FIG. 3B, in accordance with one embodiment of the present invention.

FIG. 3D depicts a simplified exemplary assignment of the design shapes depicted in FIG. 3A and graph vertices depicted in FIG. 3A and FIG. 3C to three masks, in accordance with one embodiment of the present invention.

DETAILED DESCRIPTION

Figure 1:
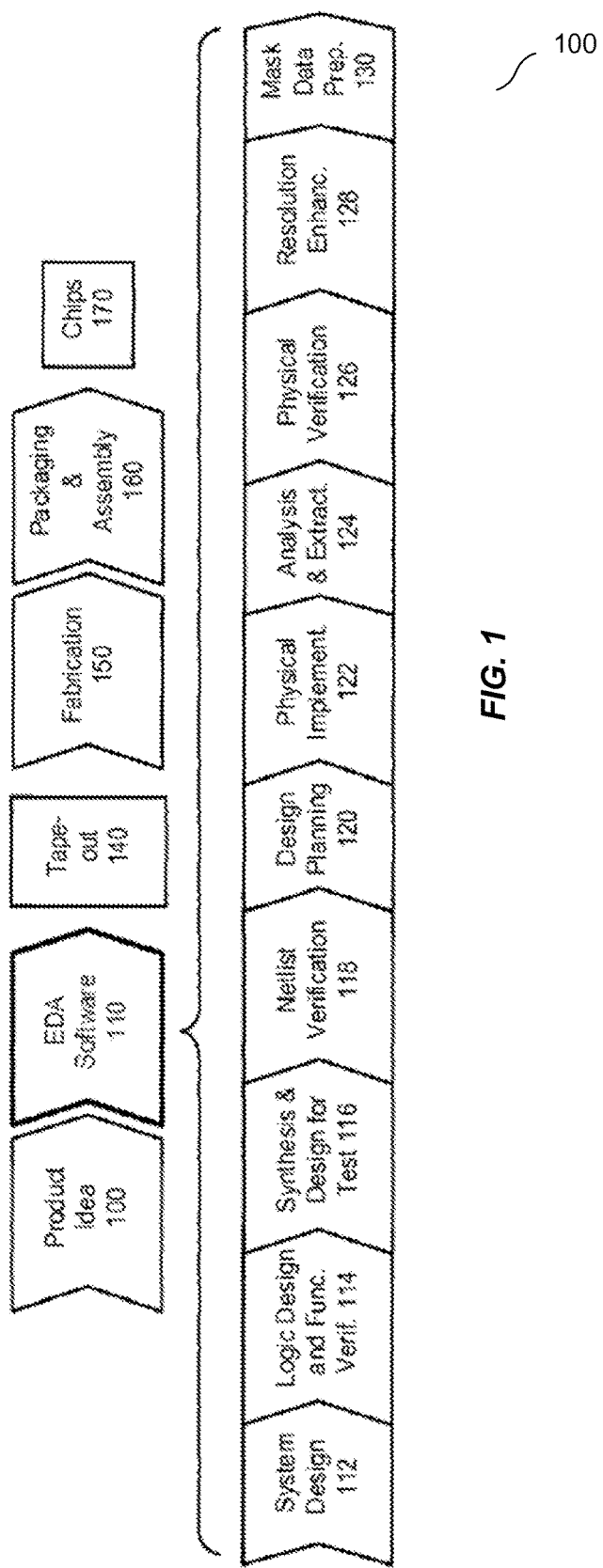
FIG. 1 depicts simplified exemplary steps in the design and fabrication of an integrated circuit.

FIG. 1 depicts simplified exemplary steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps. An exemplary design flow that uses EDA software 110 is described below for illustration purposes only. For example, an actual integrated circuit design may require a designer to perform the design flow steps in a different sequence than the sequence described below.

In the system design 112, a designer describes the functionality to be implemented. The designer can also perform what-if planning to refine the functionality and to check costs. Further, hardware-software architecture partitioning can occur at this step. In the design and functional verification 114, a Hardware Description Language (HDL) design may be created and checked for functional accuracy.

In the synthesis and design 116, the HDL code can be translated to a netlist, which can be optimized for the target technology. Further, tests can be designed and implemented to check the finished chips. In the netlist verification 118, the netlist can be checked for compliance with timing constraints and for correspondence with the HDL code. In the design planning 120, an overall floor plan for the chip can be constructed and analyzed for timing and top-level routing. Next, in the physical implementation 122, placement and routing can be performed.

In the analysis and extraction 124, the circuit functionality can be verified at a transistor level. In the physical verification 126, the design can be checked to correct any functional, manufacturing, electrical, or lithographic issues. In the resolution enhancement 128, geometric manipulations can be performed on the layout to improve manufacturability of the design. Finally, in the mask data preparation 130, the design can be taped-out 140 for production of masks to produce finished chips. The embodiments of the present invention may be used, for example at the steps of either physical verification 126 and/or mask data preparation 130.

In accordance with one embodiment of the present invention, techniques are provided for detecting, displaying, or identifying printability errors in a design intent using a multiple-patterning process. In one embodiment, the design may include an IC. In some embodiments, the design intent may include two-dimensional patterns or shapes that correspond to a circuit design implementing any logic, analog, or analog-digital function in an integrated circuit. The following embodiments are described with a triple-patterning process, however, the embodiments of the present invention are equally applicable to multiple-patterning with more than three masks.

In one embodiment, validating a design intent for a triple-patterning process includes determining whether a graph representative of a portion of the design intent is three-colorable. Each vertex, hereinafter also referred to as a "node", in the graph may correspond to a shape in the design intent, and each edge in the graph may correspond to two shapes in the design intent that are separated by a design rule constraint such as, for example, a space that is less than a pre-determined distance. For example, the minimum spacing allowed between two shapes may depend on various parameters associated with the shapes, and the minimum allowable spacing between two shapes may be determined based solely or partly on a set of design rule constraints.

For double-patterning, determining whether a graph is k-colorable with k=2 may be solved by a compact, linear time algorithm to determine double-patterning errors. The double-patterning errors are odd cycles in the corresponding graph, where a cycle is a closed loop in the graph that includes a multitude of edges and an odd cycle is a cycle with an odd number of edges. Various graph examples with k≥3 will be described below.

However, determining whether a graph is k-colorable, where k≥3, belongs to a class of hard-to-solve computer problems, formally known as Nondeterministic-Polynomial-complete (NP-complete) problems. It is unlikely to have a fast algorithm to solve a NP-complete problem optimally. In other words, there is no known compact mathematical description or characterization of the multiple-patterning errors for k≥3. Unless otherwise noted, the term "multiple-patterning" will refer to multiple-patterning for k-colorability with k≥3, e.g. triple or higher-patterning processes. It is understood that whether a graph is non-decomposable or decomposable into k colors is, in part, a function of the coloring algorithm and available computing resources due to the complex NP-complete coloring problem when k≥3. In other words, when k≥3 one coloring algorithm may find the graph non-decomposable, while another different coloring algorithm may successfully decompose the same graph given the same computing resources.

Many approximation algorithms have been proposed to solve the k>=3 multiple-coloring problem. For some special cases of design intents, a solution for triple-patterning decomposition uses double-patterning decomposition. Customized evolutionary algorithms are used in a very fast approximate statistical solution for checking graph k-colorability for k>=3, as described in U.S. application Ser. No. 14/185,717, filed on Feb. 20, 2014, entitled "Hybrid Evolutionary Algorithm For Triple-Patterning."

When the design intent cannot be printed with three or more multiple masks, e.g. for a triple patterning process the graph representing the design intent is not 3-colorable, one embodiment of the present invention detects and displays or identifies and outputs the errors responsible for the non-decomposable graph using a multitude of error outputs, thereby providing quick, useful guidance for the circuit designer to choose which errors to fix. By using the multitude of error output embodiments described below, the circuit designer develops a familiarity or understanding of what to expect from each type of error output display. Therefore, the multitude of error output embodiments provide the flexibility for the circuit designer to select the desired error output display type to best solve the problem. The errors may then be fixed manually or by an automated system to make the modified layout shapes of the design decomposable.

Figure 2:
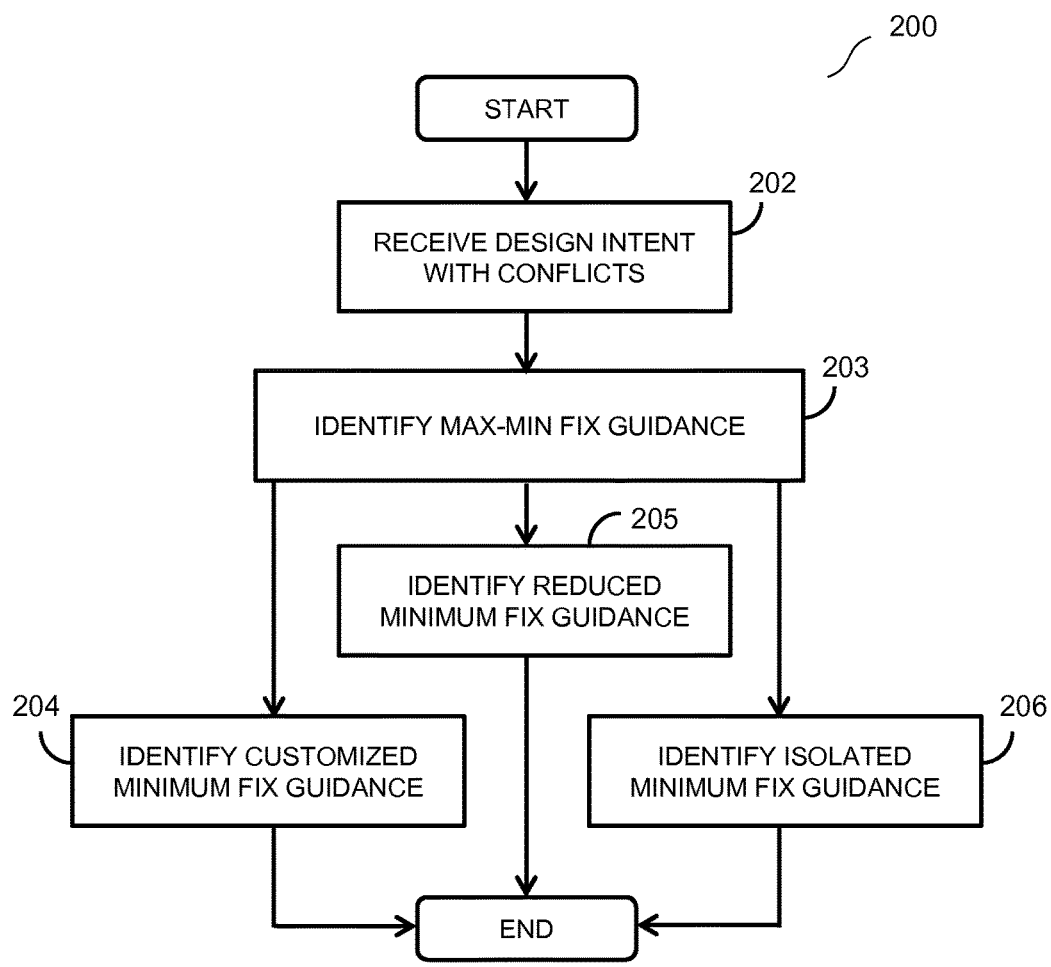
FIG. 2 depicts a simplified exemplary flow chart for displaying at least one guidance to fix at least one mask layout conflict of a design intent, in accordance with one embodiment of the present invention.

FIG. 2 depicts a simplified exemplary flow chart 200 for displaying at least one guidance to fix at least one mask layout conflict of a design intent, in accordance with one embodiment of the present invention. After starting, the technique includes receiving 202 the design intent of a multiple-patterning process. The design intent may include a multitude of shapes and at least one mask layout conflict or error. The at least one mask layout conflict causes the coloring of the graph associated with the design intent to be non-decomposable into the specified multitude of masks. In other words the at least one mask layout conflict prevents decomposition of the design intent into the specified multitude of masks of the multiple-patterning process. Each of the at least three colors is associated with a different one of at least three masks used in a multiple-patterning process. A conflict or error edge is an edge whose end vertices are colored with the same color and whose corresponding shapes in the design intent may not meet a design rule constraint such as a minimum allowable spacing based solely or partly on the set of design rules.

Next, at least one guidance to fix the at least one mask layout conflict is identified and output. In one embodiment a multitude of fix guidance display types may be identified and output as described below. A circuit designer or user may then select which one of the multitude of fix guidance display types to display on a screen of a computing device.

A coloring attempt for a non-decomposable graph includes at least one conflict-edge. In one embodiment, the system identifies 204, i.e. detects or identifies and outputs a fix guidance display type including at least one customized minimum conflict edge. A customized minimum conflict edge is an edge that when fixed makes the design decomposable by the multiple-patterning process. The customized minimum fix guidance is useful because the minimum number of edges and shapes may be displayed to be fixed, thus minimizing the number of edits to the design intent, which may be a preferred solution. Customized minimum fix guidance may be customized as per user specifications, or as per automated specifications or preferences configures to prefer one type of conflict edge rather than another. One such specification may include, for example, a preference of minimizing the vertex degrees of the conflict edges, i.e. the number of edges that are connected to a vertex. After identifying 204 the customized minimum fix guidance, the flow may end.

In one embodiment, the system identifies 203, i.e. detects or identifies and outputs, at least one maximum-minimum fix guidance display type. The maximum-minimum fix guidance may be an extension of the customized minimum fix guidance described above. A maximum-minimum fix guidance indicates most alternative minimum conflict edge configurations by running a multitude of coloring attempts and selecting conflicts edges from those coloring attempts that minimize the number of conflicts. In other words, the maximum-minimum fix guidance displays edges and shapes in the vicinity of the customized minimum fix guidance providing the designer more flexibility to solve the coloring problem via alternative edits to the design intent other than the customized minimum fix guidance. Such alternative solutions may be easier or simpler to accomplish for practical reasons than just fixing the customized minimum conflict edge. The maximum-minimum fix guidance may be agnostic or independent of the graph structure.

In contrast, another known technique to display a portion of the design intent containing only one error is dependent on graph structure and is limited to what is called a conflict cycle. A conflict cycle is a graph with four vertices, where each vertex is connected by an edge to all the other three vertices having one error edge responsible for the graph being non-decomposable. However, the embodiments of the present invention are not limited to the conflict cycle or any other graph structure. Further, embodiments of the present invention may output many types of fix guidance, including guidance to fix more than one error in a non-decomposable graph.

In one embodiment the system identifies 204 the customized minimum fix guidance after identifying 203 the maximum-minimum fix guidance, the customized minimum fix guidance being a sub-type of the maximal-minimal fix guidance. In one embodiment, after identifying 203 the maximum-minimum fix guidance, the technique may end. In another embodiment, after identifying 203 the maximum-minimum fix guidance, the technique may continue to find other fix guidance types.

In one embodiment, the system identifies 205, i.e. detects or identifies and outputs, at least one reduced-minimum fix guidance display type. The reduced-minimum fix guidance may be constructed from the maximal-minimal fix guidance by deleting parts of the maximal-minimal fix guidance that may not be needed by some methods to fix the errors. Interaction between the design rules and the design intent may be used to construct the reduced-minimum fix guidance. After identifying 205 the reduced-minimum fix guidance, the flow may end.

In one embodiment, the system identifies 206, i.e. detects or identifies and outputs, at least one isolated-minimum fix guidance display type. An isolated-minimum fix guidance corresponds to the isolated parts of the graph after decomposition is attempted. The graph corresponding to the design intent may include sub-graphs. A sub-graph may be decomposed or colorable independently of other sub-graphs. The isolated parts of the graph are the sub-graph that is not decomposable or that contains the multi-patterning conflict. Known graph theoretic methods such as bi-connectivity and tri-connectivity may be used to decompose the graph. To fix a conflict edge, it suffices to fix the isolated part, i.e. the sub-graph, containing the isolated conflict edge. The isolated-minimum fix guidance output may be used to isolate the areas of the design for fixing manually or using automated tools. The sub-graph in the isolated-minimum fix guidance output captures more shapes compared to the other fix guidance types so that automated tools may find a better overall fix by adjusting more shapes in the region of the multi-patterning conflict. After identifying 206 the isolated-minimum fix guidance, the flow may end.

FIG. 3A depicts a simplified exemplary first design intent including four shapes 301, 302, 303, and 304. FIG. 3B depicts simplified exemplary construction of a graph 300B including vertices 301, 302, 303, and 304 associated respectively with shapes 301, 302, 303, and 304 depicted in FIG. 3A, in accordance with one embodiment of the present invention. Referring to FIG. 3B, during graph construction, two shapes are connected by a line, hereinafter also referred to as an "edge" 305, if there is a design rule constraint such as a spacing constraint or rule violation between them. Then the two shapes connected by an edge may not be assigned to the same mask. In other words, the graph may include a multitude of edges 305 and each one of the multitude of edges may be associated with a different pair of the multitude of shapes 301-304, each pair of the multitude of shapes being associated with a design rule constraint. For example, shapes 301 and 302 in design intent 300A may not be assigned to the same mask, hence line or edge 305 is connected between vertices 301 and 302 in graph 300B. Similarly, graph 300B includes edges connected between vertex pairs (301, 304), (302, 304), (302, 303), and (303, 304). FIG. 3C depicts a simplified exemplary three-coloring of the graph depicted in FIG. 3B, in accordance with one embodiment of the present invention. FIG. 3C depicts vertices 301 and 303 are assigned one color, vertex 302 is assigned a second color, and vertex 304 is assigned a third color. FIG. 3D depicts a simplified exemplary assignment of the design shapes depicted in FIG. 3A and graph vertices depicted in FIG. 3C to three masks, in accordance with one embodiment of the present invention. FIG. 3D depicts shapes 301 and 303 are assigned to one mask, shape 302 is assigned to a second mask, and shape 304 is assigned to a third mask.

Figure 4A:
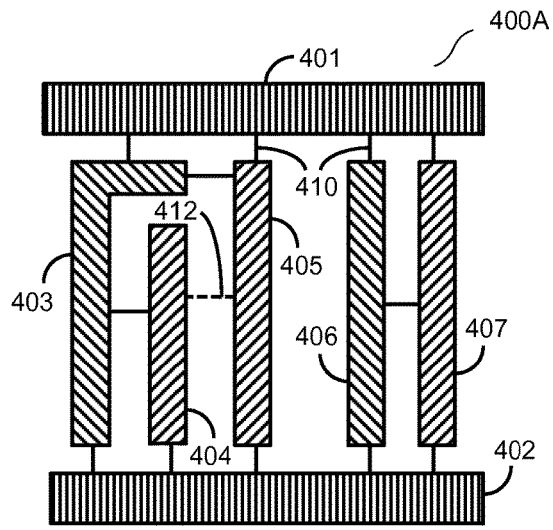
FIG. 4A depicts a simplified exemplary first non-decomposable design intent, in accordance with one embodiment of the present invention.

FIG. 4A depicts a simplified exemplary first non-decomposable design intent 400A, in accordance with one embodiment of the present invention. Design intent 400A includes a multitude of shapes of a first color 401, 402, a multitude of shapes of a second color 403, 406, and a multitude of shapes of a third color 404, 405, 407.

Design intent 400A further includes a multitude of links 410 shown as solid lines representing design rule constraints between some shapes. A link is distinguishable from an edge in that there may be multiple links associated with one edge because multiple design rule constraints, associated with the multiple links, may exist between two shapes. For example, referring to FIGS. 5A-5C described below, side-to-side and corner-to-corner design rules between shapes 508 and 512 are associated with links 524, 526 respectively, while only one edge in the associated graph (not shown) may be associated with both links 524, 526.

Referring to FIG. 4A, design intent 400A further includes one multi-patterning conflict link 412, shown as a dashed line that is responsible for the non-decomposability of the graph associated with design intent 400A. Design intent 400A is non-decomposable because the pair of shapes 404, 405 connected by conflict link 412 have been colored the same color during an attempted decomposition of the associated graph into three colors. It is understood that removing the coloring of shapes in design intent 400A would provide the original design intent before attempting decomposition. It is further understood that the coloring of design intent 400A is indicated to depict that decomposition was attempted yielding the color assignments as shown but was incomplete because design intent 400A is non-decomposable due to the remaining multi-patterning conflict link 412.

Figure 4B:
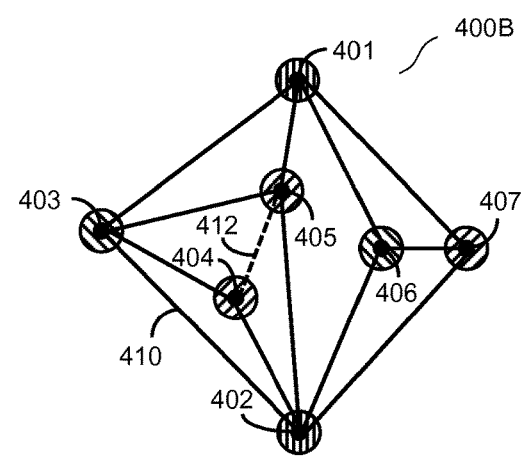
FIG. 4B depicts a simplified exemplary graph corresponding to the design intent depicted in FIG. 4A including a customized minimum conflict edge, in accordance with one embodiment of the present invention.

FIG. 4B depicts a simplified exemplary graph 400B corresponding to the design intent 400A depicted in FIG. 4A including a customized minimum conflict edge 412, in accordance with one embodiment of the present invention. FIG. 4B depicts graph 400B has been colored by a coloring attempt such that graph 400B includes a multitude of vertices of a first color 401, 402, a multitude of vertices of a second color 403, 406, and a multitude of vertices of a third color 404, 405, 407, where the same reference numbers as used to show the correspondence between a vertex and its associated shape in the design intent. Graph 400B further includes edges 410 depicted as solid lines and a customized minimum conflict edge 412 depicted as a dotted line. Conflict link 412 may be detected when one of the multitude of edges 410 is between a pair of the multitude of vertices 404, 405 colored with the same color.

Figure 4C:
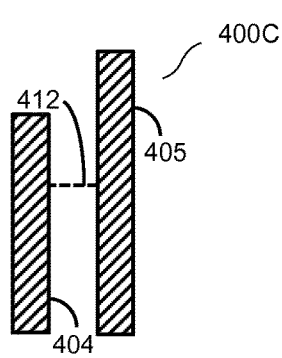
FIG. 4C depicts a simplified exemplary customized minimum fix guidance output for the design intent depicted in FIG. 4A, in accordance with one embodiment of the present invention.

FIG. 4C depicts an exemplary customized minimum fix guidance output 400C for the design intent 400A depicted in FIG. 4A, in accordance with one embodiment of the present invention. Customized minimum fix guidance output 400C includes shapes 404 and 405 colored the same color and customized minimum conflict link 412.

Figure 4D:
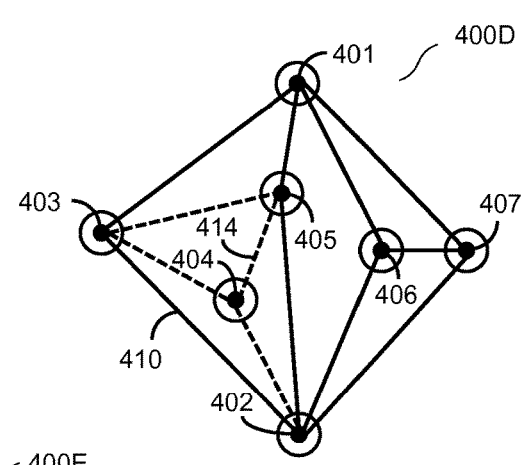
FIG. 4D depicts a simplified exemplary graph corresponding to the design intent depicted in FIG. 4A including a multitude of maximum-minimum fix guidance edges, in accordance with one embodiment of the present invention.

FIG. 4D depicts a simplified exemplary graph 400D corresponding to the design intent 400A depicted in FIG. 4A including a multitude of maximum-minimum fix guidance edges 414, in accordance with one embodiment of the present invention. Graph 400D is the same as graph 400B depicted in FIG. 4B except graph 400D includes a multitude of maximum-minimum fix guidance edges 414 depicted as dotted lines and the vertices are not colored because some of the vertices may be of various colorings. The multitude of maximum-minimum fix guidance edges 414 may be obtained by a multitude of coloring attempts as will be explained in more detail below. For example, the multitude of maximum-minimum fix guidance edges 414 may include customized minimum conflict edge 412 depicted in FIG. 4B corresponding to one coloring attempt, while other conflict edges included in the multitude of maximum-minimum fix guidance edges 414 may be derived from coloring attempts different from the one depicted in FIG. 4B. Therefore, no coloring is depicted in FIG. 4D since the multitude of maximum-minimum fix guidance edges 414 may represent a multitude of different coloring attempts, each attempt coloring the multitude of vertices with a possibly different coloring combination.

Figure 4E:
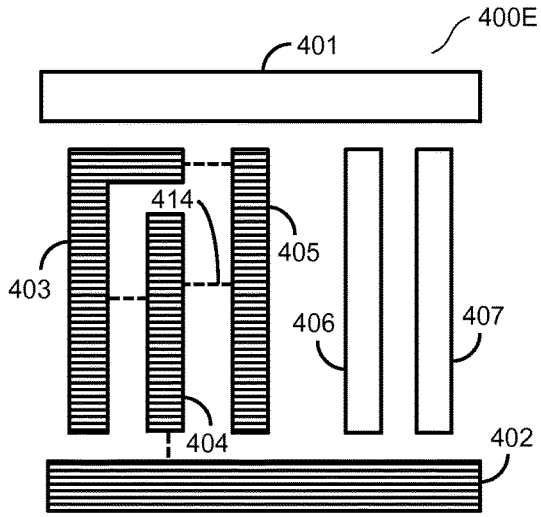
FIG. 4E depicts a simplified exemplary maximum-minimum fix guidance output for the design intent depicted in FIG. 4A, in accordance with one embodiment of the present invention.

FIG. 4E depicts a simplified exemplary maximum-minimum fix guidance output 400E for the design intent 400A depicted in FIG. 4A, in accordance with one embodiment of the present invention. Maximum-minimum fix guidance output 400E includes shapes 402, 403, 404, 405 as being the shapes to be adjusted by the user, as opposed to shapes 401, 406, 407, which are not part of the maximum-minimum fix guidance. Maximum-minimum fix guidance output 400E further includes maximum-minimum conflict links 414 depicted as dotted lines. Maximum-minimum conflict links 414 include customized minimum conflict link 412 depicted in FIG. 4C. FIG. 4E depicts maximum-minimum fix guidance output 400E includes four maximal-minimal conflict links 414 that may be associated with maximum-minimum fix guidance edges 414 depicted in FIG. 4D. The user or an automated system can fix any one of these four maximal-minimal conflict links depicted in FIG. 4E to eliminate the triple-patterning error.

Figure 5A:
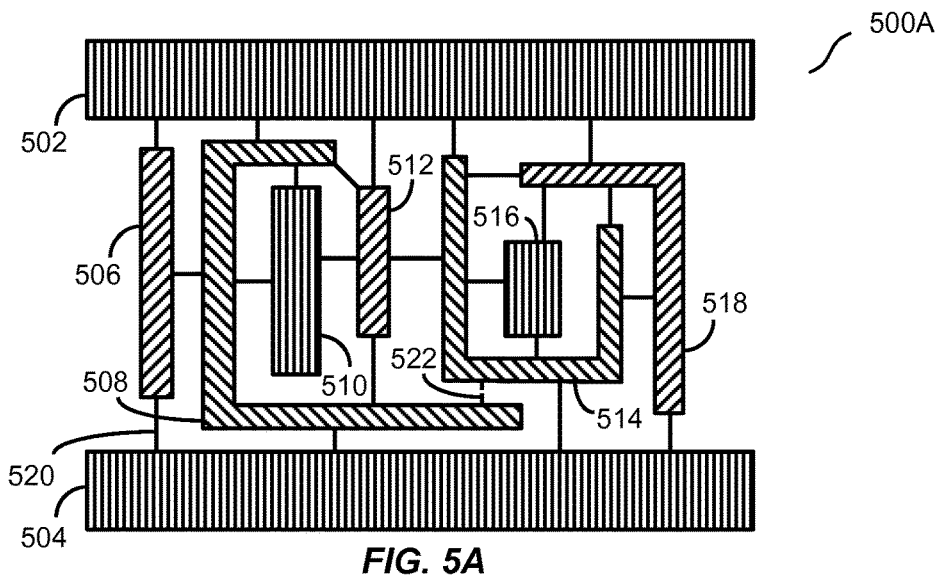
FIG. 5A depicts a simplified exemplary second non-decomposable design intent, in accordance with one embodiment of the present invention.

FIG. 5A depicts a simplified exemplary second non-decomposable design intent 500A, in accordance with one embodiment of the present invention. Design intent 500A includes a multitude of shapes of a first color 502, 504, 510, 516, a multitude of shapes of a second color 508, 514, and a multitude of shapes of a third color 506, 512, 518. Design intent 500A further includes a multitude of links 520 shown as solid lines representing design rule constraints between some shapes and one customized minimum conflict link 522, shown as a dashed line that is responsible for the non-decomposability of the graph (not shown) associated with design intent 500A.

Figure 5B:
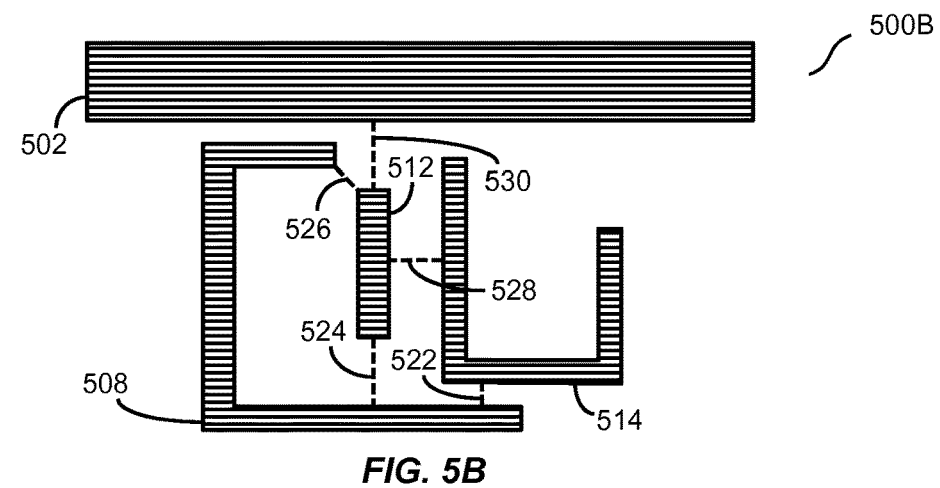
FIG. 5B depicts a simplified exemplary maximum-minimum fix guidance output of the design intent depicted in FIG. 5A, in accordance with one embodiment of the present invention.

FIG. 5B depicts a simplified exemplary maximum-minimum fix guidance output 500B of the design intent 500A depicted in FIG. 5A, in accordance with one embodiment of the present invention. FIG. 5B depicts maximum-minimum fix guidance output 500B includes shapes 502, 508, 512, 514. Maximum-minimum fix guidance output 500B further includes maximum-minimum conflict links 522-530 depicted as dashed lines. The maximum-minimum conflict links include customized minimum conflict link 522.

Figure 5C:
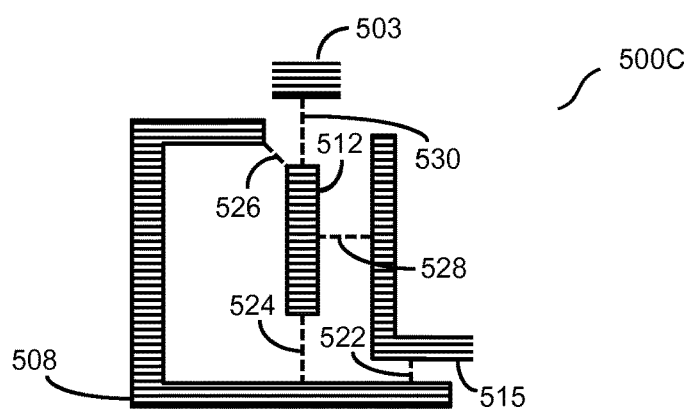
FIG. 5C depicts a simplified exemplary reduced-minimum fix guidance output for the design intent depicted in FIG. 5A, in accordance with one embodiment of the present invention.

FIG. 5C depicts a simplified exemplary reduced-minimum fix guidance output 500C for the design intent 500A depicted in FIG. 5A, in accordance with one embodiment of the present invention. FIG. 5C depicts reduced-minimum fix guidance output 500C, which includes the same shapes and links as maximum-minimum fix guidance output 500B depicted in FIG. 5B except as described below. Portions of some of the shapes in reduced-minimum fix guidance output 500C may be cut away such that the cut away portions are located distal or far away from the maximum-minimum conflict links 522-530. For example, referring simultaneously with FIGS. 5B and 5C, shape 502 may be cut where shape 502 does not overlap with a small region located around maximum-minimum link 530, so as to form shape 503. Similarly, shape 514 may be cut where shape 514 does not overlap with a region associated with a loop that includes maximum-minimum links 522, 524, 528 and portions of shapes 508, 512, 514, so as to form shape 515. In this example, all of shape 508 remains uncut because the entire shape lies within a loop as described below in reference to FIG. 7B.

Figure 6A:
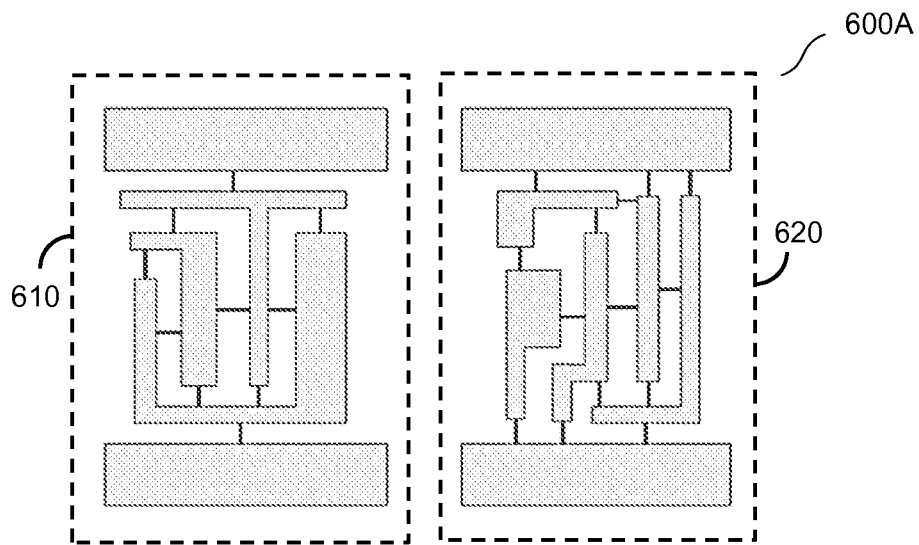
FIG. 6A depicts a simplified exemplary third non-decomposable design intent, in accordance with one embodiment of the present invention.

FIG. 6A depicts a simplified exemplary third non-decomposable design intent 600A, in accordance with one embodiment of the present invention. Design intent 600A includes a multitude of areas 610, 620, each area corresponding to a different sub-graph. Each of the areas may include a multitude of shapes and links between some of the shapes. In this example, area 610 corresponds to a sub-graph that is decomposable into multiple-patterning masks, while area 620 corresponds to a sub-graph that is not decomposable into multiple-patterning masks.

Figure 6B:
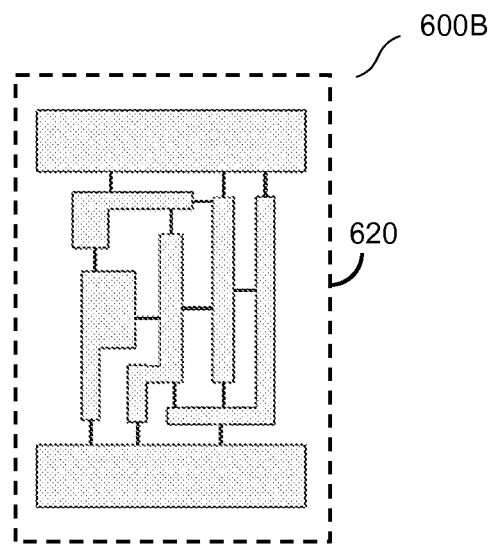
FIG. 6B depicts a simplified exemplary isolated-minimum fix guidance output for the design intent depicted in FIG. 6A, in accordance with one embodiment of the present invention.

FIG. 6B depicts a simplified exemplary isolated-minimum fix guidance output 600B for the design intent 600A depicted in FIG. 6A, in accordance with one embodiment of the present invention. In one embodiment, the computer outputs isolated-minimum fix guidance including a representation of a portion of the design associated with the non-decomposable graph. In one embodiment, the isolated-minimum fix guidance 600B includes a subset of the m of shapes of the design intent associated with the non-decomposable graph. FIG. 6B depicts isolated-minimum fix guidance output 600B includes the shapes and links associated with area 620, which corresponds to a sub-graph that is not decomposable into multiple-patterning masks. Referring to FIGS. 6A-6B, the shapes and links associated with area 610, which corresponds to a sub-graph that is decomposable into multiple-patterning masks is not output in isolated-minimum fix guidance output 600B.

Figure 7A:
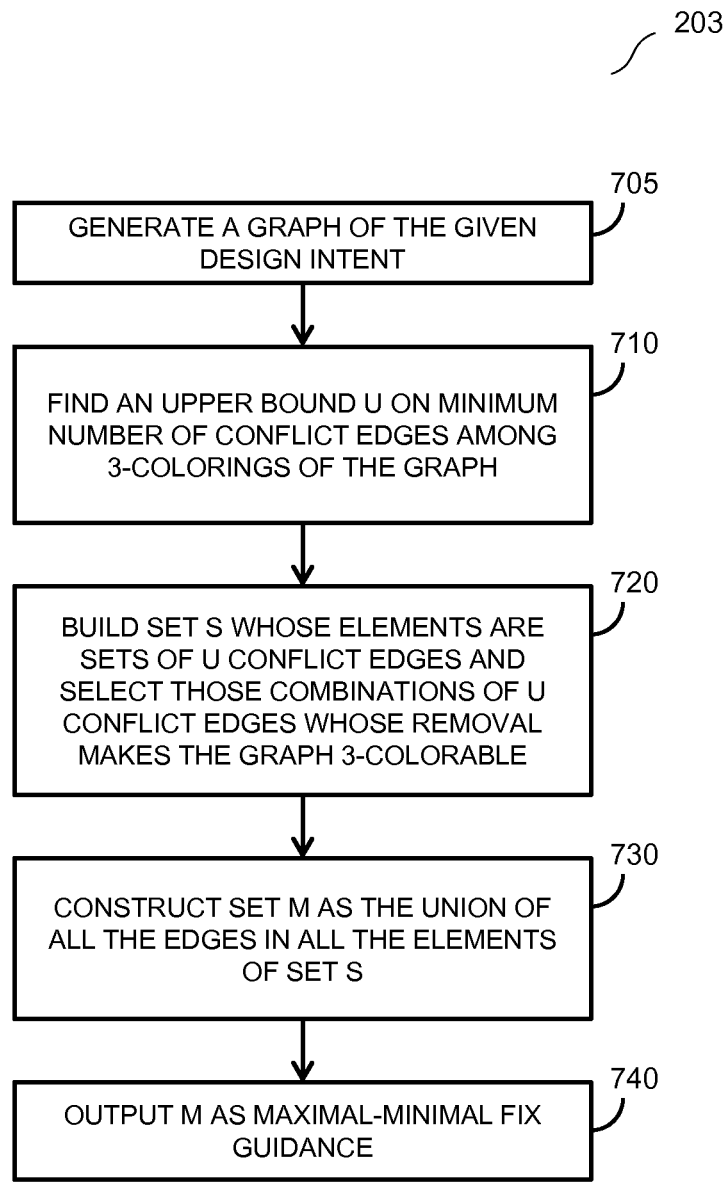
FIG. 7A depicts a simplified exemplary flow chart for identifying, i.e. detecting and outputting, at least one maximum-minimum fix guidance depicted in FIG. 2, in accordance with one embodiment of the present invention.

FIG. 7A depicts a simplified exemplary flow chart 203 for identifying, i.e. detecting and outputting, at least one maximum-minimum fix guidance display type depicted in FIG. 2, in accordance with one embodiment of the present invention. In one embodiment, a coloring algorithm determines the graph is non-decomposable. Referring simultaneously to FIGS. 7A and 4A-4B, FIGS. 7A depicts a graph 400B is generated or formed 705, where graph vertices 401-407 represent the shapes of the design intent and customized minimum conflict edge 412 represents the conflict conditions where shapes 404, 405 connected to the same edge 412 should not be on the same mask or color in the multi-patterning process because of a design rule constraint or violation. In other words, the computer generates 705 graph 400B, which may be non-decomposable to a colored graph that may be representative of design intent 400A, when the computer is invoked to validate the design.

FIGS. 7A depicts an upper bound U on the minimum number of conflict edges among a multitude of three colorings of the graph may be found 710. In one embodiment, the coloring algorithm includes an exhaustive search algorithm. In another embodiment, the coloring algorithm includes an approximation algorithm. Such an upper bound can be found using an exhaustive search if the graph size is small, or the upper bound may be calculated using approximation algorithms such as described in U.S. application Ser. No. 14/185, 717, filed on Feb. 20, 2014, entitled "Hybrid Evolutionary Algorithm For Triple-Patterning." For example, a multitude of coloring attempts or iterations, such as for example graph 400B depicted in FIG. 4B, may be run and the number of conflict edges for each run of the multitude of coloring attempts may be registered. Thus, in one coloring attempt U+1 conflict edges may be found, while in another coloring attempt U conflict edges may be found, U being the lowest number of conflict edges found in that multitude of coloring attempts. Therefore, U may be an upper bound on the minimum number of conflict edges among a multitude of three colorings of the graph. FIG. 4B depicts U=1 because one coloring iteration of a multitude of coloring attempts identified a single customized minimum conflict edge.

An optimal upper bound is not required to produce a useful fix guidance output. For example, one coloring algorithm may produce U conflict edges in a predetermined allowable number of coloring attempts. However, the same coloring algorithm may eventually find a coloring attempt with even U−1 conflict edges at an unacceptably greater cost in computer resources or time compared to finding the coloring solutions that produce U conflict edges.

Next in one embodiment, the computer builds a first coloring set characterized by upper bound U on a minimum number of the at least one conflict using a first coloring attempt of one of a multitude of coloring attempts on the graph by a coloring algorithm. Elements of set S may be built 720 or calculated by exhaustive enumeration of all combinations of U conflict edges, and then selecting those combinations of U conflict edges whose removal will make the graph 3-colorable. In one embodiment, in the course of iterative colorizing attempts, the computer builds a second coloring set characterized by upper bound U on the minimum number of the at least one conflict using a second coloring attempt of one of the multitude of coloring attempts. The second set may be a different one from the first coloring set and finding a different conflict edge. For example, the location of conflict edges for each iteration of the multitude of coloring attempts that produce only U conflict edges may be registered. The algorithm may then discard the conflict edge locations resulting from the coloring attempt that produced U+1 conflict edges, while saving the conflict edge locations from the coloring attempts that produced U conflict edges to form set S.

In one embodiment, the computer outputs the customized minimum fix guidance as a subset of the maximum-minimum fix guidance including a representation of the design associated with the first set S. In another embodiment, the customized minimum fix guidance output by the computer includes a subset of the multitude of shapes 404, 405, the subset being associated with the first set S and customized minimum conflict link 412. In one embodiment, the computer outputs the customized minimum fix guidance by building the first set S by including finding upper bound U customized in accordance with a specification preferring at least one conflict rather than another conflict.

In one embodiment, the computer constructs a third set associated with a union of the first set and the second set. Because U may be greater than one, conflict edges in set S may be duplicative. Referring simultaneously to FIGS. 7A and 4D-4E, set M is constructed 730 as the union of all conflict edges 414 in all the elements of set S to reduce duplication of conflict edges. Set M contains most alternative minimal sets of conflict edges 414 of the graph. The computer identifies at least one guidance to at least one conflict 414 in a mask layout associated with the design, the conflict causing the graph to be non-decomposable into three or more colors. In one embodiment, the computer outputs the guidance 400E including a representation of the design associated with the third set. Set M is output 740 as the maximal-minimal fix guidance including all conflict edges 414 of members of elements of S and vertices 402-405 connected to those conflict edges.

In one embodiment, the maximal-minimal fix guidance may include a representation of the design associated with the third set or the union of the first and second sets. In one embodiment, the guidance may include a subset of the multitude of shapes, the subset being associated with the third set. Referring to FIG. 4E in one embodiment, output 740 may include shapes 402-405, which may be a subset of the multitude of shapes of the design intent, shapes 402-405 being associated with vertices 402-405 of graph 400D. Fixing the layout of shapes of the design intent that result in removal of at least one of the conflict edges of the corresponding graph makes the graph three-colorable or decomposable into three colors and the design intent able to be used in a triple patterning process without design rule errors.

Figure 7B:
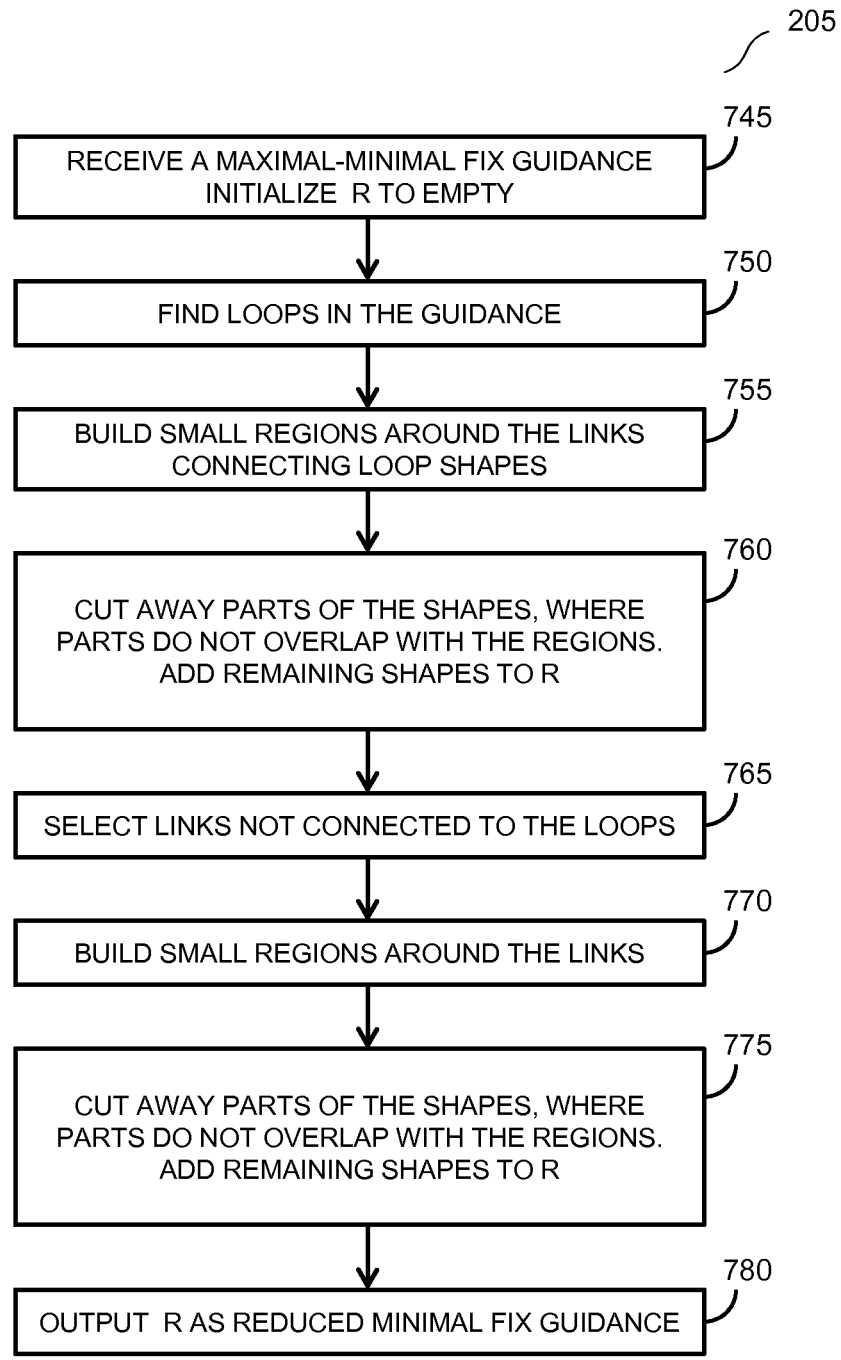
FIG. 7B depicts a simplified exemplary flow chart for identifying, i.e. detecting and outputting, at least one reduced-minimum fix guidance depicted in FIG. 2, in accordance with one embodiment of the present invention.

FIG. 7B depicts a simplified exemplary flow chart 205 for identifying, i.e. detecting and outputting, at least one reduced-minimum fix guidance display type depicted in FIG. 2, in accordance with one embodiment of the present invention. Identifying the reduced-minimum fix guidance may include cutting away, using the computer, a portion of at least one of the shapes in a first subset of the multitude of shapes thereby forming a second subset. The portion of at least one of the shapes may be disposed distal to or far from the union M of the first and second sets. The first subset may be associated with the third set or the union M of the first and second sets. Referring simultaneously to FIGS. 5B, 5C, and 7B, a maximal-minimum fix guidance 500B is received 745 as an input, and initializes R to empty, where R represents the reduced-minimum fix guidance to be output. In one embodiment, the cutting away may be done by the computer in accordance with a closed loop formed by a multitude of shapes of the first subset and a multitude of the at least one conflict. Loops in the input maximal-minimum fix guidance 500B are found 750. A loop is a closed connected path, based in part on the shapes and links of the maximal-minimum fix guidance. For example, one loop includes shapes 508, 512 and maximum-minimum conflict links 524, 526, and another loop includes shapes 508, 512, 514 and maximum-minimum conflict links 522, 524, 528. A loop may include at least two shapes and at least two maximum-minimum conflict links.

A multitude of small regions are built or constructed 755 around the maximum-minimum conflict links connecting the shapes in the loops. In one embodiment, the size of each small region may be associated with a portion of a perimeter of a shape that is associated with a design rule conflict, such as for example a minimum space around the shape. Parts of the shapes, which do not overlap with the small regions, are cut away 760, and the remaining shapes are added to R. However, portions of shapes that form part of a loop may not be cut, such as the vertically oriented section of shape 508. Next, links not forming loops, such as maximum-minimum conflict link 530, are selected 765, and small regions around those selected links are built 770. Once again, parts of the shapes, which do not overlap with the small regions, are cut 775, and the remaining shapes, such as shape 503, which is a cut portion of shape 502, are added to R. The computer outputs 780 the reduced-minimum fix guidance R or 500C, which includes the second subset.

Figure 8A:
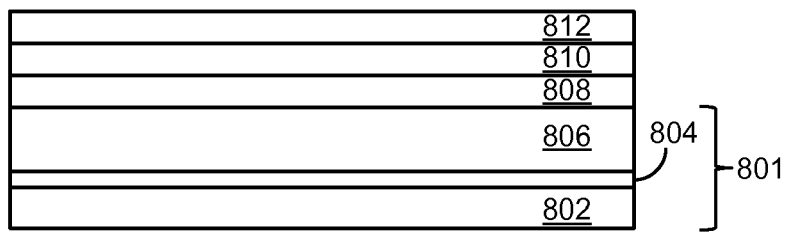
FIGS. 8A-8W depict simplified exemplary cross-sections of a process flow using a triple-patterning process, in accordance with one embodiment of the present invention.
Figure 8B:
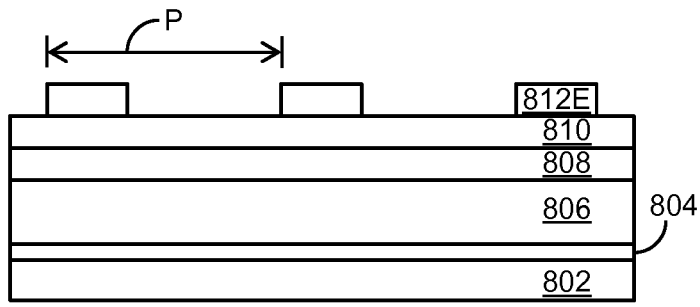
Figure 8C:
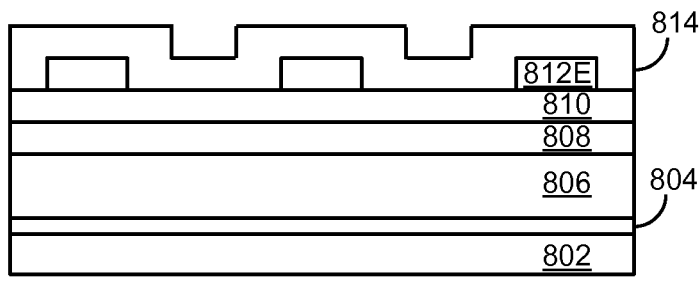
Figure 8D:
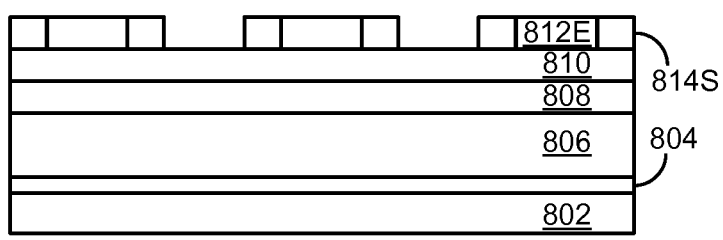
Figure 8E:
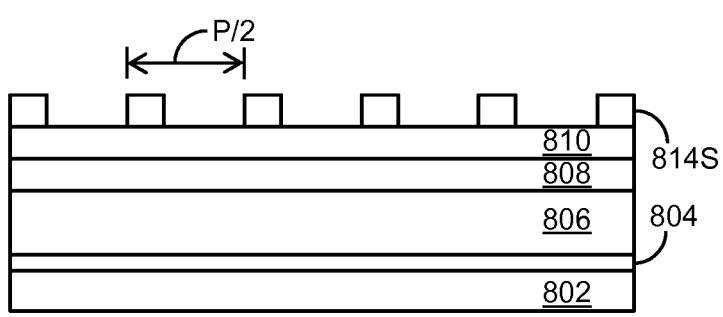
Figure 8F:
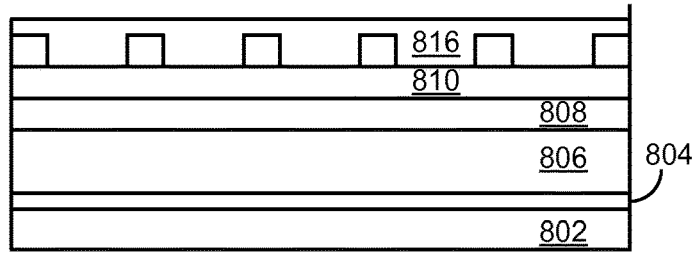
Figure 8G:
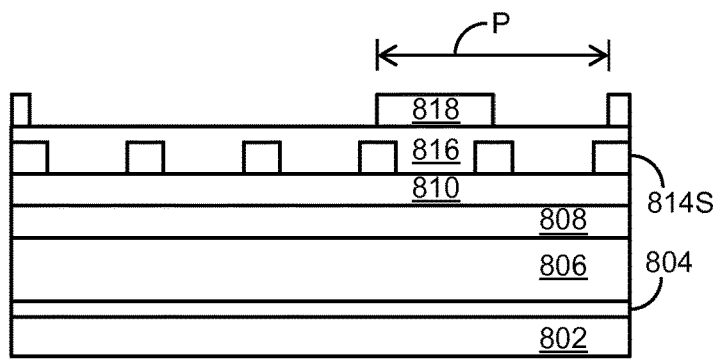
Figure 8H:
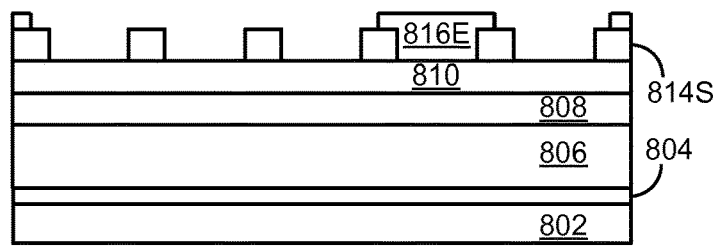
Figure 8I:
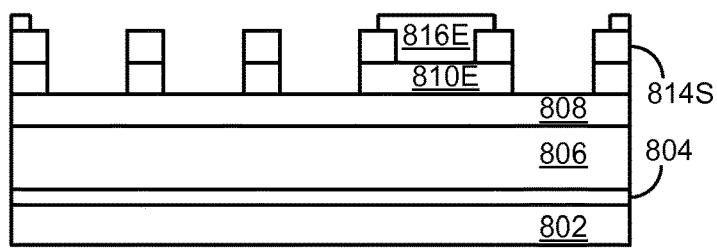
Figure 8J:
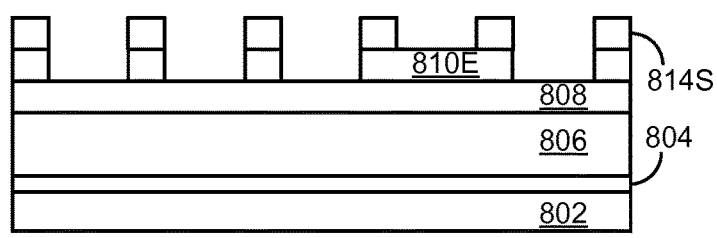
Figure 8K:
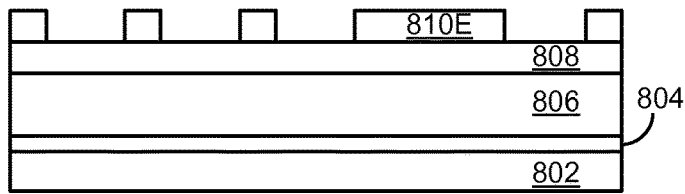
Figure 8L:
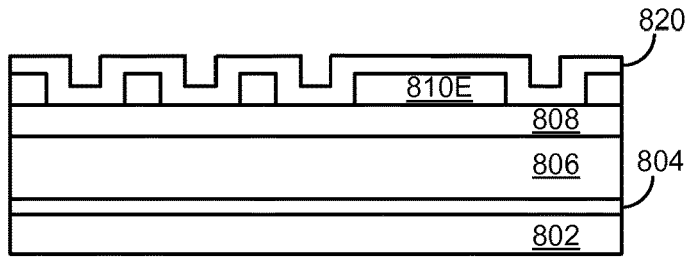
Figure 8M:
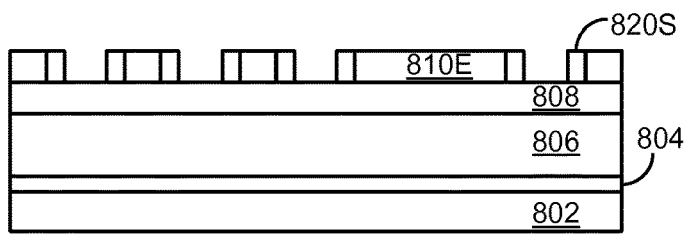
Figure 8N:
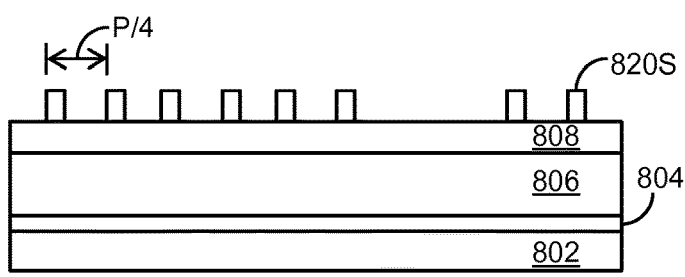
Figure 8O:
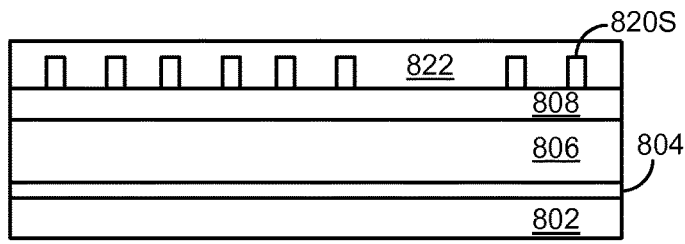
Figure 8P:
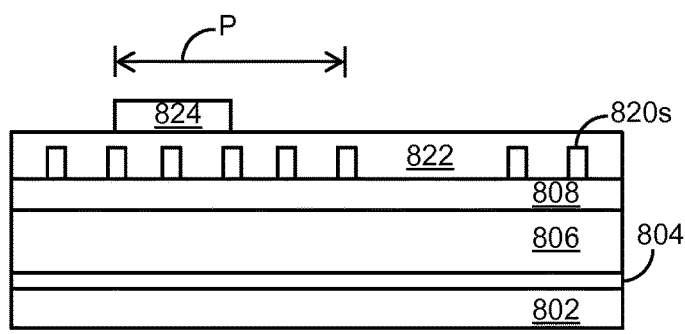
Figure 8Q:
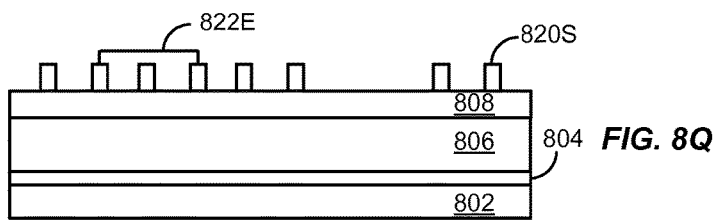
Figure 8R:
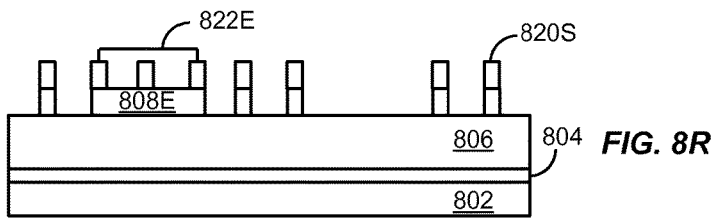
Figure 8S:
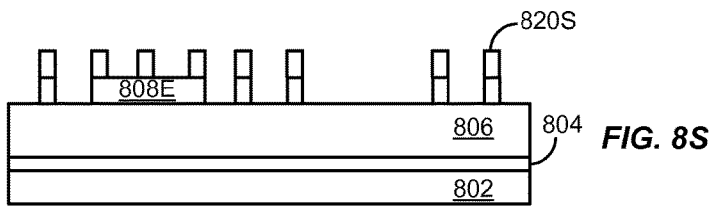
Figure 8T:
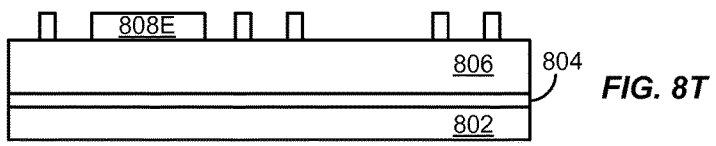
Figure 8U:
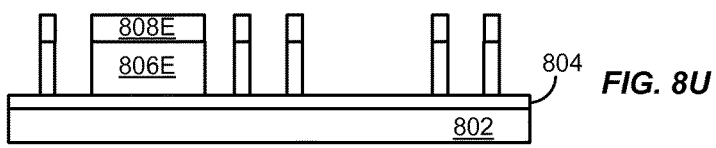
Figure 8V:
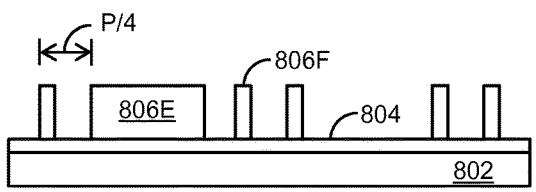
Figure 8W:
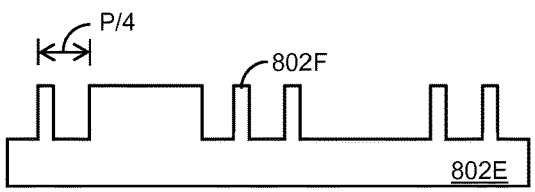
Figure 9:
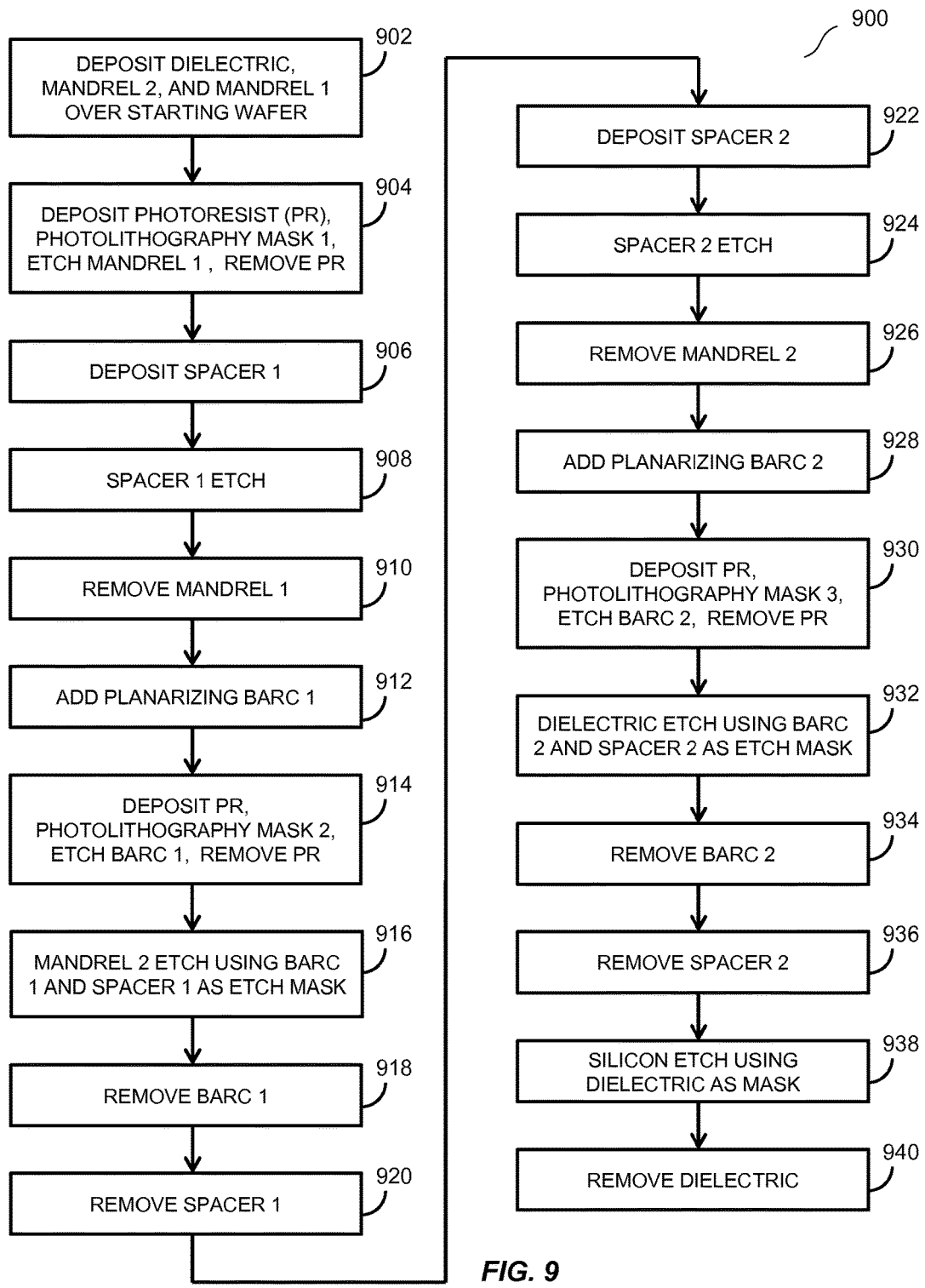
FIG. 9 depicts a simplified exemplary flowchart for the process flow depicted in FIGS. 8A-8W, in accordance with one embodiment of the present invention.

FIGS. 8A-8W depict simplified exemplary cross-sections of a process flow using a triple-patterning process, in accordance with one embodiment of the present invention. FIG. 9 depicts a simplified exemplary flowchart 900 for the process flow depicted in FIGS. 8A-8W, in accordance with one embodiment of the present invention. Referring simultaneously to FIGS. 8A-8W and FIG. 9, a starting wafer 801 may include a thin dielectric layer 804, also referred to herein as a buried oxide (BOX), formed between a silicon substrate 802 and a crystalline silicon layer 806. Crystalline silicon layer 806 may be formed by bonding a second single crystal silicon wafer to another first single crystal silicon wafer that was previously oxidized and then cutting the second single crystal silicon wafer to the thickness desired for crystalline silicon layer 806. In an alternative embodiment, starting wafer 801 may include a single crystal silicon wafer without the BOX processing. The following description will refer to the BOX process flow by example, however as will be seen, it is understood that a single crystal silicon wafer without the BOX processing may be used in an alternative embodiment.

As depicted in FIG. 8A, a multitude of layers including layers with different etching characteristics may be deposited 902 so as to overlay crystalline silicon layer 806. For example, a dielectric layer 808 may be deposited to overlay crystalline silicon layer 806 followed by depositing a mandrel 2 layer 810 to overlay dielectric layer 808. Then, a mandrel 1 layer 812 may be deposited to overlay mandrel 2 layer 810. In alternative embodiments, different layers than those described above may be used, such as for example a greater number of layers than the three deposited layers described above may be used depending on the etching characteristics of the layers used.

After the deposition 902 of the multitude of layers, a photolithography sequence 904 applies photoresist (PR) (not shown), exposes the PR using a mask 1, develops the PR, and etches mandrel 1 layer 812, and removes the PR leaving the pattern of mask 1 in mandrel 1 pattern 812E as depicted in FIG. 8B. Various alternative steps for the photolithography sequence are possible. The pattern of mask 1 in mandrel 1 pattern 812E may include a pattern having a minimum process technology pitch, P, as shown by the arrow that includes the sum of a minimum line and minimum space. In other words, although the line within P may be processed wider or narrower, the sum of the line and space within P may not be processed any smaller for this technology example using just one photolithography sequence using just one mask.

Next, a spacer 1 layer 814 may be deposited 906 in conformal fashion so as to overlay the mandrel 1 pattern 812E as depicted in FIG. 8C. Then, spacer 1 layer 814 may be etched 908 so as to leave behind spacers 1 structures 814S at the sidewalls of mandrel 1 pattern 812E as depicted in FIG. 8D. Then, mandrel 1 pattern 812E may be removed 910 as depicted in FIG. 8E. It should be noted that the pitch in spacers 1 structures 814S may be about half of P as shown by the arrows. Next, a planarizing bottom anti-reflective coating 1 (BARC 1) layer 816 may be added 912 so as to overlay spacers 1 structures 814S and mandrel 2 layer 810 as depicted in FIG. 8F.

Then, a second photolithography sequence 914 applies a PR layer, exposes the PR using a mask 2, develops the PR leaving PR pattern 818, which again may be patterned with pitch P as shown by the arrows in FIG. 8G. BARC 1 layer 816 may be etched leaving BARC 1 pattern 816E after PR removal as depicted in FIG. 8H. Next, mandrel 2 layer 810 may be etched 916 using BARC 1 pattern 816E and spacers 1 structures 814S as hard-masks leaving behind mandrel 2 pattern 810E as depicted in FIG. 8I. Then, BARC 1 pattern 816E may be removed 918 as depicted in FIG. 8J. Next, FIG. 8K depicts the cross-section after spacers 1 structures 814S are removed 920 and provide patterns having about one half the pitch available using a single photolithography mask.

Next, a spacer 2 layer 820 may be deposited 922 in conformal fashion so as to overlay the mandrel 2 pattern 810E as depicted in FIG. 8L. Then, spacer 2 layer 820 may be etched 924 so as to leave behind spacers 2 structures 820S at the sidewalls of mandrel 2 pattern 810E as depicted in FIG. 8M. Then, mandrel 2 pattern 810E may be removed 926 as depicted in FIG. 8N. It should be noted that the pitch in spacers 2 structures 820S may be about one fourth of P as shown by the arrows. Next, a planarizing bottom anti-reflective coating 2 (BARC 2) layer 822 may be added 928 so as to overlay spacers 2 structures 820S and dielectric layer 808 as depicted in FIG. 8O.

Then, a third photolithography sequence 930 applies a PR layer, exposes the PR using a mask 3, develops the PR leaving patterned PR layer 824, which again may be patterned with pitch P as shown by the arrows in FIG. 8P. BARC 2 layer 822 may be etched leaving BARC 2 pattern 822E after PR removal as depicted in FIG. 8Q. Next, dielectric layer 808 may be etched 932 using BARC 2 pattern 822E and spacers 2 structures 820S as hard-masks leaving behind dielectric pattern 808E as depicted in FIG. 8R. Then, BARC 2 pattern 822E may be removed 934 as depicted in FIG. 8S. Next, FIG. 8T depicts the cross-section after spacers 2 structures 820S are removed 936. Then dielectric pattern 808E may be used as a hard mask to etch 938 crystalline silicon layer 806 as depicted in FIG. 8U. Next, dielectric pattern 808E may be removed as depicted in FIG. 8V leaving crystalline silicon pattern 806E, which in-turn includes crystalline silicon fins 806F. In an alternative embodiment, when the single crystal silicon wafer without the BOX processing may be used, the processing sequence of steps 904 through 940 may be similar, resulting in the cross-section depicted in FIG. 8W, which includes crystalline silicon pattern 802E, which in-turn includes crystalline silicon fins 802F.

The resulting patterns in crystalline silicon patterns 806E and 802E may be complex, including sections without fins where the crystalline silicon layer 806 or crystalline silicon substrate 802 are not etched, i.e. pedestals or plateaus, and sections where the crystalline silicon layer 806 is etched away or crystalline silicon substrate 802 is etched forming a wide trench. Further, the resulting patterns in crystalline silicon patterns 806E and 802E may include a pitch that is about one fourth the pitch available using just a single mask. Thus, the pitch achievable using triple-patterning technology may be about half the pitch achievable using double-patterning technology and about one fourth the pitch achievable using a single mask, which leads to greater density integrated circuits using triple patterning, as depicted by the arrows in FIG. 8V and FIG. 8W.

The complex crystalline silicon patterns 806E and 802E are made possible, in-part, because of the validation embodiments of the present invention referred to in FIG. 2 through FIG. 7, which may be performed for the design intents and associated shapes used in mask 1 through mask 3 referenced in FIGS. 8B, 8G, 8P and associated respective photolithography sequences 904, 914, 930 referenced in FIG. 9. The crystalline silicon fins 806F, 802F depicted in FIG. 8V and FIG. 8W may be subsequently used in the fabrication of three dimensional transistors such as fin-FETs or triple-gate FETs requiring smaller pitch than that available using a single mask or double patterning technology. In alternative embodiments, other process flows may be used to analogously form structures such as gates for other types of transistors as well as metal interconnects using a metal trench fill and chemical mechanical polish CMP planarization process.

Figure 10:
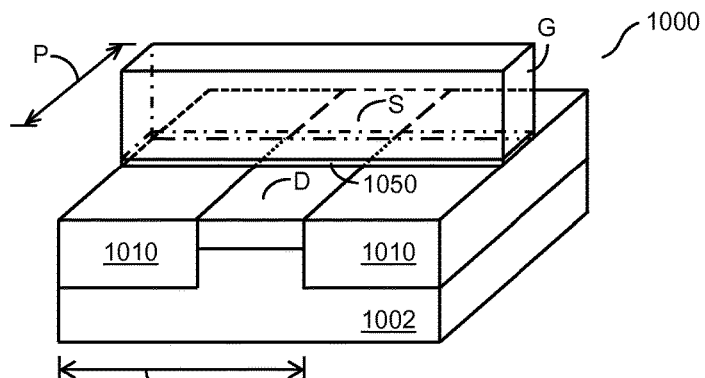
FIG. 10 depicts a simplified exemplary perspective view of an insulated-gate field-effect-transistor (IG-FET).

FIG. 10 depicts a simplified exemplary perspective view of an insulated-gate field-effect-transistor (IG-FET) 1000. IG-FET 1000 may include a crystalline silicon substrate 1002, shallow trench isolation 1010 (STI dielectric) formed on each side of a crystalline silicon pedestal, a gate dielectric 1050 formed between the crystalline silicon pedestal and a gate, G, formed as a stripe running lengthwise in the plane of FIG. 10 and over STI 1010. IG-FET 1000 may further include source S and drain D regions formed by implanting dopant atoms into the crystalline silicon pedestal in self aligned fashion on each side of gate G. The minimum pitch P normally available for the STI/crystalline silicon pedestal and/or the gate patterns is depicted by arrows. The circuit density achievable is thus limited in-part by pitch P. The power wasted by IG-FET 1000 may be limited by leakage currents between D and S that are not under the control of G and may in aggregate over a multitude of transistors further limit circuit density.

Figure 11:
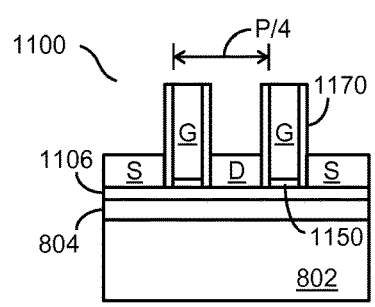
FIG. 11 depicts a simplified exemplary cross-section view of a fully-depleted silicon-on-insulator (FDSOI) FET manufactured using a triple-patterning process, in accordance with one embodiment of the present invention.

FIG. 11 depicts a simplified exemplary cross-section view of a fully-depleted silicon-on-insulator (FDSOI) FET 1100 manufactured using a triple-patterning process, in accordance with one embodiment of the present invention. FDSOI FET 1100 may include a starting wafer similar to starting wafer 801 referenced above in FIG. 8A except overlying BOX layer 804, a crystalline silicon layer 1106 includes a thickness that may be thinner than crystalline silicon layer 806 used for fin-FET manufacture. FDSOI FET 1100 may further include a pair of connected gates G. In accordance with one embodiment of the present invention, the design intent used to form pair of connected gates G may be validated and patterned using the triple patterning embodiments described herein with a pitch P/4 as depicted by the arrows to increase circuit density. Pair of connected gates G may have spacers 1170 formed between the gates G and raised doped silicon S and D regions. FDSOI FET 1100 may have reduced leakage characteristics because the silicon channel region immediately below the gates G may be formed thinner using a thin crystalline silicon layer 1106 so as to be fully depleted by the gates G when FDSOI FET 1100 is biased off.

Figure 12:
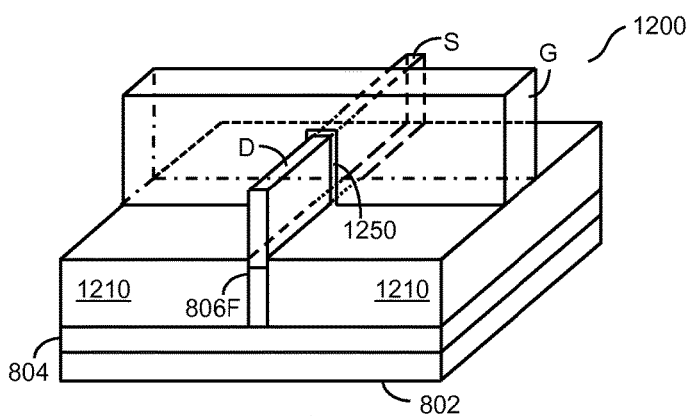
FIG. 12 depicts a simplified exemplary perspective view of a fin-FET transistor.

FIG. 12 depicts a simplified exemplary perspective view of a fin-FET transistor 1200. FinFET transistor 1200 may include starting wafer 801 referenced above in FIG. 8A, fin 806F referenced in FIG. 8V, STI regions 1210, gate G formed overlaying and surrounding the portion of fin 806F above STI 1210, gate dielectric 1250 between the portion of fin 806F above STI 1210 and gate G, and S and D doped regions in the portion of fin 806F slightly below the surface of STI 1210 and on each side of gate G. The channel region may deplete fully when the gate is biased off because fin 806F is narrow and the gate surrounds the channel on at least two sides. Analogous fin-FET structures may be formed using the starting wafer 801 without BOX processing as described in reference to FIG. 8W.

Figure 13:
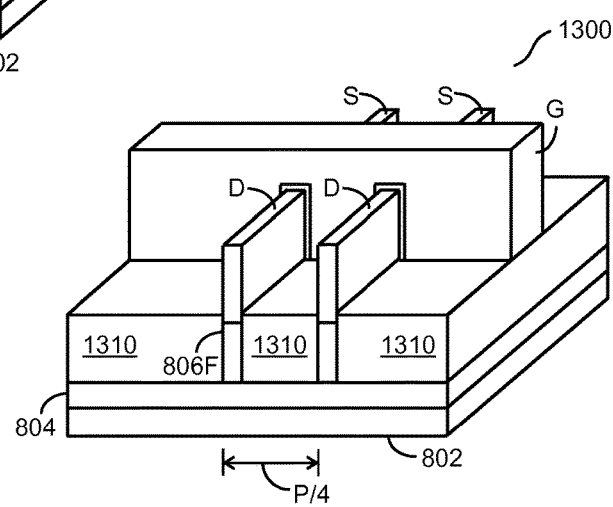
FIG. 13 depicts a simplified exemplary perspective view of a fin-FET transistor manufactured, in part, using the triple-patterning process depicted in FIGS. 8A-8W and FIG. 9, in accordance with one embodiment of the present invention.

FIG. 13 depicts a simplified exemplary perspective view of a fin-FET transistor 1300 manufactured, in part, using the triple-patterning process depicted in FIGS. 8A-8W and FIG. 9, in accordance with one embodiment of the present invention. Fin-FET transistor 1300 may include a pair of fins 806F with S and D respectively connected in parallel to form a single FET with double the current drive capability compared to fin-FET transistor 1200. STI 1310 may be formed on each side of the pair of fins 806F. Pair of fins 806F may be manufactured with pitch P/4, as depicted by the arrows, using triple patterning technology as depicted in FIG. 8V or FIG. 8W providing higher circuit density that achievable using single mask or double-patterning technology. The design intent used to form the pair of parallel connected fins 806F may be validated using the triple-patterning embodiments of the present invention referred to in FIG. 2 through FIG. 7. The triple-patterning validation for fin-FET transistor 1300 may be performed on the design intents and associated shapes used in mask 1 through mask 3 referenced in FIGS. 8B, 8G, 8P before the triple-patterning wafer process for associated respective photolithography sequences 904, 914, 930 referenced in FIG. 9. It would be understood that fins 802F referenced in FIG. 8W may be used optionally replacing fins 806F when BOX processing is not used.

Figure 14:
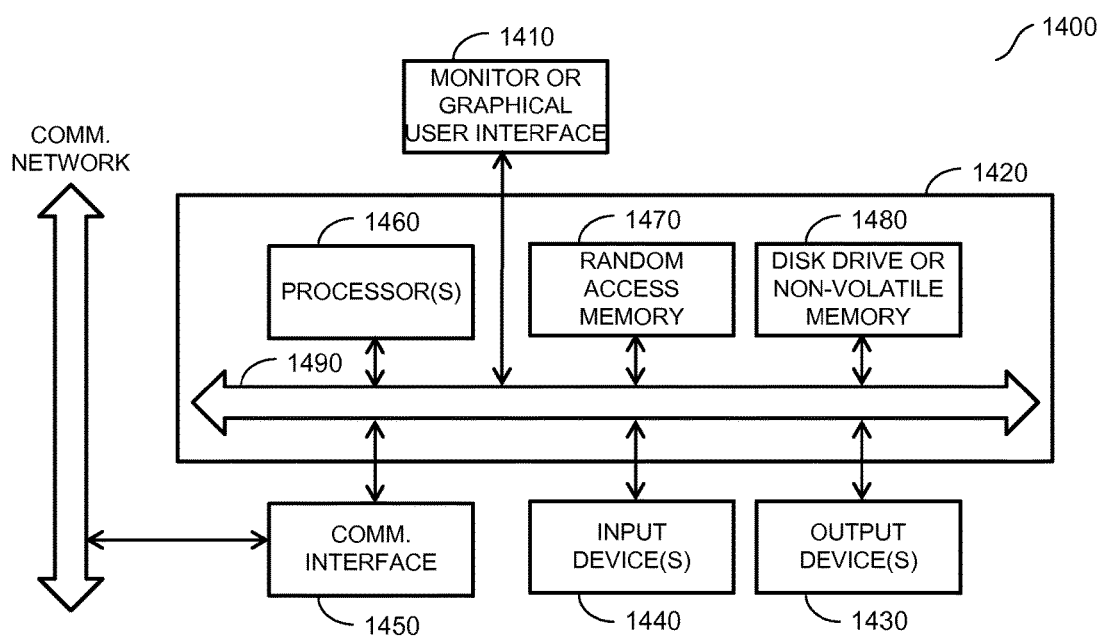
FIG. 14 is a block diagram of a computer system that may incorporate embodiments of the present invention.

FIG. 14 is a block diagram of a computer system that may incorporate embodiments of the present invention. FIG. 14 is merely illustrative of an embodiment incorporating the present invention and does not limit the scope of the invention as recited in the claims. One of ordinary skill in the art would recognize other variations, modifications, and alternatives.

In one embodiment, computer system 1400 typically includes a monitor 1410, a computer 1420, user output devices 1430, user input devices 1440, communications interface 1450, and the like.

As shown in FIG. 14, computer 1420 may include a processor(s) 1460 that communicates with a number of peripheral devices via a bus subsystem 1490. These peripheral devices may include user output devices 1430, user input devices 1440, communications interface 1450, and a storage subsystem, such as random access memory (RAM) 1470 and disk drive 1480.

User input devices 1430 include all possible types of devices and mechanisms for inputting information to computer system 1420. These may include a keyboard, a keypad, a touch screen incorporated into the display, audio input devices such as voice recognition systems, microphones, and other types of input devices. In various embodiments, user input devices 1430 are typically embodied as a computer mouse, a trackball, a track pad, a joystick, wireless remote, drawing tablet, voice command system, eye tracking system, and the like. User input devices 1430 typically allow a user to select objects, icons, text and the like that appear on the monitor 1410 via a command such as a click of a button or the like.

User output devices 1440 include all possible types of devices and mechanisms for outputting information from computer 1420. These may include a display (e.g., monitor 1410), non-visual displays such as audio output devices, etc.

Communications interface 1450 provides an interface to other communication networks and devices. Communications interface 1450 may serve as an interface for receiving data from and transmitting data to other systems. Embodiments of communications interface 1450 typically include an Ethernet card, a modem (telephone, satellite, cable, ISDN), (asynchronous) digital subscriber line (DSL) unit, FireWire interface, USB interface, and the like. For example, communications interface 1450 may be coupled to a computer network, to a FireWire bus, or the like. In other embodiments, communications interfaces 1450 may be physically integrated on the motherboard of computer 1420, and may be a software program, such as soft DSL, or the like.

In various embodiments, computer system 1400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1420 includes one or more Xeon microprocessors from Intel as processor(s) 1460. Further, one embodiment, computer 1420 includes a UNIX-based operating system.

RAM 1470 and disk drive 1480 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 1470 and disk drive 1480 may be configured to store the basic programming and data constructs that provide the functionality of the present invention.

Software code modules and instructions that provide the functionality of the present invention may be stored in RAM 1470 and disk drive 1480. These software modules may be executed by processor(s) 1460. RAM 1470 and disk drive 1480 may also provide a repository for storing data used in accordance with the present invention.

RAM 1470 and disk drive 1480 may include a number of memories including a main random access memory (RAM) for storage of instructions and data during program execution and a read only memory (ROM) in which fixed non-transitory instructions are stored. RAM 1470 and disk drive 1480 may include a file storage subsystem providing persistent (non-volatile) storage for program and data files. RAM 1470 and disk drive 1480 may also include removable storage systems, such as removable flash memory.

Bus subsystem 1490 provides a mechanism for letting the various components and subsystems of computer 1420 communicate with each other as intended. Although bus subsystem 1490 is shown schematically as a single bus, alternative embodiments of the bus subsystem may utilize multiple busses.

FIG. 14 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to a triple-patterning technology using three colors for validation by way of an example, it is understood that the invention is not limited by the triple-patterning technology but may also be applicable to higher than triple-patterning technologies such as technologies using more than three colors during validation. Although, the invention has been described with reference to an exemplary process for manufacturing certain integrated circuit transistor components by way of an example, it is understood that the invention is not limited by the type of process nor the type of transistor components so long as the process of components may benefit from the use of a triple-patterning or higher-patterning technology. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

What is claimed is:

1. A computer implemented method for validating a design of an integrated circuit, said design including a plurality of shapes, the method comprising:
   generating, using the computer, a graph non-decomposable to a colored graph representative of the design, when the computer is invoked to validate the design;
   identifying, using the computer, at least one guidance to at least one conflict in a mask layout associated with the design, said conflict causing the graph to be non-decomposable, wherein the design when converted to a mask set enables manufacture of the integrated circuit after the conflict is fixed;
   building, using the computer, a first set of conflict edges characterized by an upper bound on a minimum number of the at least one conflict;
   cutting away, using the computer, a portion of at least one of the plurality of shapes; and
   disposing the portion distal to a union of the first set and a second set of conflict edges being different from the first set.

2. The computer-implemented method of claim 1, wherein the graph is representative of a portion of the design that is non-decomposable.

3. The computer-implemented method of claim 1, wherein the colored graph includes at least three colors.

4. The computer-implemented method of claim 3, wherein each of the at least three colors is associated with a different one of at least three masks of the mask set used in a multiple-patterning process.

5. The computer-implemented method of claim 1, wherein identifying further comprises outputting, using the computer, the guidance including a representation of a portion of the design associated with the graph.

6. The computer-implemented method of claim 5, wherein the design includes a plurality of shapes, wherein identifying further comprises outputting, using the computer, the guidance including a subset of the plurality of shapes, the subset being associated with the graph.

7. The computer-implemented method of claim 1, wherein the design includes a plurality of shapes, wherein the graph includes a plurality of vertices, each one of the plurality of vertices associated with a different one of the plurality of shapes.

8. The computer-implemented method of claim 7, wherein the graph includes a plurality of edges, wherein each one of the plurality of edges is associated with a different pair of the plurality of shapes, the pair of the plurality of shapes being associated with a design rule constraint.

9. The computer-implemented method of claim 8, wherein a conflict is detected when one of the plurality of edges is between a pair of the plurality of vertices colored with the same color.

10. The computer-implemented method of claim 1, wherein building further comprises using a first coloring attempt of one of a plurality of coloring attempts on the graph by a coloring algorithm.

11. The computer-implemented method of claim 10, wherein the coloring algorithm determines the graph is non-decomposable.

12. The computer-implemented method of claim 10, wherein the coloring algorithm includes an exhaustive search algorithm.

13. The computer-implemented method of claim 10, wherein the coloring algorithm includes an approximation algorithm.

14. The computer-implemented method of claim 10, wherein the coloring algorithm includes a hybrid evolutionary algorithm.

15. The computer-implemented method of claim 10, wherein identifying further comprises:
   building, using the computer, the second set of conflict edges characterized by the upper bound on the minimum number of the at least one conflict using a second coloring attempt of one of the plurality of coloring attempts, the second set being different from the first set;
   constructing, using the computer, a third set of conflict edges associated with a union of the first set and the second set; and
   outputting, using the computer, the guidance including a representation of the design associated with the third set.

16. The computer-implemented method of claim 15, wherein the design includes a plurality of shapes, wherein identifying further comprises outputting, using the computer, the guidance including a subset of the plurality of shapes, the subset being associated with the third set.

17. The computer-implemented method of claim 15, wherein the design includes a plurality of shapes, wherein identifying further comprises:
   cutting away, using the computer, a portion of at least one of the shapes in a first subset of the plurality of shapes thereby forming a second subset, the portion being disposed distal to the union, the first subset being associated with the third set; and
   outputting, using the computer, the guidance including the second subset.

18. The computer-implemented method of claim 17, wherein the cutting away is in accordance with a closed loop formed by a plurality of shapes of the first subset and a plurality of the at least one conflict.

19. The computer-implemented method of claim 18, wherein the cutting away is in accordance with at least one conflict not included in the closed loop.

20. The computer-implemented method of claim 1, wherein identifying further comprises outputting, using the computer, the guidance including a representation of the design associated with the first set.

21. The computer-implemented method of claim 1, wherein the design includes a plurality of shapes, wherein identifying further comprises outputting, using the computer, the guidance including a subset of the plurality of shapes, the subset being associated with the first set.

22. The computer-implemented method of claim 1, wherein building includes finding the upper bound customized in accordance with a specification preferring at least one conflict rather than another conflict.

23. An electronic design automation (EDA) tool adapted to generate data associated with an integrated circuit design and a mask set of an integrated circuit, said design including a plurality of shapes, the data causing the EDA tool to:
generate a graph non-decomposable to a colored graph representative of the integrated circuit design, when the EDA tool is invoked to validate the integrated circuit design;
identify at least one guidance to at least one conflict in a mask layout associated with the integrated circuit design, said conflict causing the graph to be non-decomposable, wherein the design when converted to the mask set enables manufacture of the integrated circuit after the conflict is fixed;
build a first set of conflict edges characterized by an upper bound on a minimum number of the at least one conflict;
cut away a portion of at least one of the plurality of shapes; and
dispose the portion distal to a union of the first set and a second set of conflict edges being different from the first set.

24. The EDA tool of claim 23, wherein the graph is representative of a portion of the integrated circuit design that is non-decomposable.

25. The EDA tool of claim 23, wherein the colored graph includes at least three colors.

26. The EDA tool of claim 25, wherein each of the at least three colors is associated with a different one of at least three masks of the mask set used in a multiple-patterning process.

27. The EDA tool of claim 23, wherein the data further cause the EDA tool to output the guidance including a representation of a portion of the integrated circuit design associated with the graph.

28. The EDA tool of claim 27, wherein the integrated circuit design includes a plurality of shapes, wherein the data further cause the EDA tool to output the guidance including a subset of the plurality of shapes, the subset being associated with the graph.

29. The EDA tool of claim 23, wherein the integrated circuit design includes a plurality of shapes, wherein the graph includes a plurality of vertices, each one of the plurality of vertices associated with a different one of the plurality of shapes.

30. The EDA tool of claim 29, wherein the graph includes a plurality of edges, wherein each one of the plurality of edges is associated with a different pair of the plurality of shapes, the pair of the plurality of shapes being associated with a design rule constraint.

31. The EDA tool of claim 30, wherein a conflict is detected when one of the plurality of edges is between a pair of the plurality of vertices colored with the same color.

32. The EDA tool of claim 23, wherein the data further cause the EDA tool to use a first coloring attempt of one of a plurality of coloring attempts on the graph by a coloring algorithm.

33. The EDA tool of claim 32, wherein the coloring algorithm determines the graph is non-decomposable.

34. The EDA tool of claim 32, wherein the coloring algorithm includes an exhaustive search algorithm.

35. The EDA tool of claim 32, wherein the coloring algorithm includes an approximation algorithm.

36. The EDA tool of claim 32, wherein the coloring algorithm includes a hybrid evolutionary algorithm.

37. The EDA tool of claim 32, wherein the data further cause the EDA tool to:
build the second set of conflict edges characterized by the upper bound on the minimum number of the at least one conflict using a second coloring attempt of one of the plurality of coloring attempts, the second set being different from the first set;
construct a third set of conflict edges associated with a union of the first set and the second set; and
output the guidance including a representation of the integrated circuit design associated with the third set.

38. The EDA tool of claim 37, wherein the integrated circuit design includes a plurality of shapes, wherein the data further cause the EDA tool to output the guidance including a subset of the plurality of shapes, the subset being associated with the third set.

39. The EDA tool of claim 37, wherein the integrated circuit design includes a plurality of shapes, wherein the data further cause the EDA tool to:
cut away a portion of at least one of the shapes in a first subset of the plurality of shapes thereby forming a second subset, the portion being disposed distal to the union, the first subset being associated with the third set; and
output the guidance including the second subset.

40. The EDA tool of claim 39, wherein the data that cause the EDA tool to cut away are in accordance with a closed loop formed by a plurality of shapes of the first subset and a plurality of the at least one conflict.

41. The EDA tool of claim 40, wherein the data that cause the EDA tool to cut away are in accordance with at least one conflict not included in the closed loop.

42. The EDA tool of claim 23, wherein the data further cause the EDA tool to output the guidance including a representation of the integrated circuit design associated with the first set.

43. The EDA tool of claim 23, wherein the integrated circuit design includes a plurality of shapes, wherein the data further cause the EDA tool to output the guidance including a subset of the plurality of shapes, the subset being associated with the first set.

44. The EDA tool of claim 23, wherein the data further cause the EDA tool to find the upper bound customized in accordance with a specification preferring at least one conflict rather than another conflict.

45. A system for validating a design of an integrated circuit, said design including a plurality of shapes, said system configured to:
generate a graph non-decomposable to a colored graph representative of the design, when the computer is invoked to validate the design;
identify at least one guidance to at least one conflict in a mask layout associated with the design, said conflict causing the graph to be non-decomposable, wherein the design when converted to a mask set enables manufacture of the integrated circuit after the conflict is fixed;
build a first set of conflict edges characterized by an upper bound on a minimum number of the at least one conflict;
cut away using the computer, a portion of at least one of the plurality of shapes; and dispose the portion distal to a union of the first set and a second set of conflict edges being different from the first set.

46. The system of claim 45, wherein the graph is representative of a portion of the design that is non-decomposable.

47. The system of claim 45, wherein the colored graph includes at least three colors.

48. The system of claim 47, wherein each of the at least three colors is associated with a different one of at least three masks of the mask set used in a multiple-patterning process.

49. The system of claim 45, wherein the system is further configured to output the guidance including a representation of a portion of the design associated with the graph.

50. The system of claim 49, wherein the Original design includes a plurality of shapes, wherein the system is further configured to output the guidance including a subset of the plurality of shapes, the subset being associated with the graph.

51. The system of claim 45, wherein the Original design includes a plurality of shapes, wherein the graph includes a plurality of vertices, each one of the plurality of vertices associated with a different one of the plurality of shapes.

52. The system of claim 51, wherein the graph includes a plurality of edges, wherein each one of the plurality of edges is associated with a different pair of the plurality of shapes, the pair of the plurality of shapes being associated with a design rule constraint.

53. The system of claim 52, wherein a conflict is detected when one of the plurality of edges is between a pair of the plurality of vertices colored with the same color.

54. The system of claim 45, wherein the system is further configured to use a first coloring attempt of one of a plurality of coloring attempts on the graph by a coloring algorithm.

55. The system of claim 54, wherein the coloring algorithm determines the graph is non-decomposable.

56. The system of claim 54, wherein the coloring algorithm includes an exhaustive search algorithm.

57. The system of claim 54, wherein the coloring algorithm includes an approximation algorithm.

58. The system of claim 54, wherein the coloring algorithm includes a hybrid evolutionary algorithm.

59. The system of claim 54, wherein the system is further configured to:

build the second set of conflict edges characterized by the upper bound on the minimum number of the at least one conflict using a second coloring attempt of one of the plurality of coloring attempts, the second set being different from the first set;

construct a third set of conflict edges associated with a union of the first set and the second set; and output the guidance including a representation of the design associated with the third set.

60. The system of claim 59, wherein the design includes a plurality of shapes, wherein the system is further configured to output the guidance including a subset of the plurality of shapes, the subset being associated with the third set.

61. The system of claim 59, wherein the design includes a plurality of shapes, wherein the system is further configured to:

cut away a portion of at least one of the shapes in a first subset of the plurality of shapes thereby forming a second subset, the portion being disposed distal to the union, the first subset being associated with the third set; and output the guidance including the second subset.

62. The system of claim 61, wherein the system is further configured to cut away in accordance with a closed loop formed by a plurality of shapes of the first subset and a plurality of the at least one conflict.

63. The system of claim 62, wherein the system is further configured to cut away are in accordance with at least one conflict not included in the closed loop.

64. The system of claim 45, wherein the system is further configured to output the guidance including a representation of the design associated with the first set.

65. The system of claim 45, wherein the design includes a plurality of shapes, wherein the system is further configured to output the guidance including a subset of the plurality of shapes, the subset being associated with the first set.

66. The system of claim 45, wherein the system is further configured to find the upper bound customized in accordance with a specification preferring at least one conflict rather than another conflict.

* * * * *